United States Patent
Garner et al.

(10) Patent No.: US 12,447,543 B2
(45) Date of Patent: Oct. 21, 2025

(54) PULSED ELECTROCHEMICAL MACHINING

(71) Applicant: Rolls-Royce Corporation, Indianapolis, IN (US)

(72) Inventors: Rusty M. Garner, Indianapolis, IN (US); Damon Ward, Indianapolis, IN (US); Monica Sy Munoz, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 512 days.

(21) Appl. No.: 17/937,074

(22) Filed: Sep. 30, 2022

(65) Prior Publication Data

US 2024/0109141 A1   Apr. 4, 2024

(51) Int. Cl.
*B23H 3/06* (2006.01)
*B23H 3/02* (2006.01)
(Continued)

(52) U.S. Cl.
CPC .............. *B23H 3/06* (2013.01); *B23H 3/02* (2013.01); *B23H 3/10* (2013.01); *B23H 2300/10* (2013.01); *B33Y 80/00* (2014.12)

(58) Field of Classification Search
CPC ................................................ B23H 2300/10
See application file for complete search history.

(56) References Cited

U.S. PATENT DOCUMENTS

| | | |
|---|---|---|
| 3,144,542 A | 8/1964 | Haas et al. |
| 3,594,298 A * | 7/1971 | Abt .......................... B23H 9/14 219/69.15 |

(Continued)

FOREIGN PATENT DOCUMENTS

| | | |
|---|---|---|
| CN | 101633066 A | 1/2010 |
| CN | 101704142 B | 7/2011 |

(Continued)

OTHER PUBLICATIONS

Wang et al "Electrochemical drilling with vacuum extraction of electrolyte" Journal of Materials Processing Technology, 210 (2010), p. 238-244. (Year: 2010).*

(Continued)

*Primary Examiner* — Brian W Cohen
(74) *Attorney, Agent, or Firm* — Shumaker & Sieffert, P.A.

(57) ABSTRACT

A pulsed electrochemical machining (pECM) system including a pECM assembly. The pECM assembly includes a tool body which defines a tool axis and includes an electrode which includes an electrically conductive material and defines working surface. The pECM system includes an electrolyte system configured to supply electrolyte to an interelectrode gap, and the electrolyte system includes a vacuum system. The tool body defines a working surface configured to face a workpiece, and the working surface defines a plurality of apertures configured to fluidically couple to an electrolyte system. The tool body includes a manifold block defining at least one electrolyte inlet and at least one electrolyte outlet, a baffle element, and the electrode. The tool body is configured to receive electrolyte from an electrolyte system at the electrolyte inlet in the manifold block and feed electrolyte through the baffle element to the working surface of the electrode.

19 Claims, 13 Drawing Sheets

(51) Int. Cl.
*B23H 3/10* (2006.01)
*B33Y 80/00* (2015.01)

(56) References Cited

U.S. PATENT DOCUMENTS

| | | | |
|---|---|---|---|
| 6,402,931 | B1 | 6/2002 | Zhou et al. |
| 8,535,491 | B2 | 9/2013 | Wei et al. |
| 8,597,489 | B2 * | 12/2013 | Luo ............... C25F 7/00 |
| | | | 205/660 |
| 8,911,599 | B2 | 12/2014 | Li et al. |
| 9,943,921 | B2 | 4/2018 | Trimmer et al. |
| 10,730,125 | B2 * | 8/2020 | Forenz ............ B23H 7/22 |
| 2014/0034513 | A1 | 2/2014 | Holmes et al. |
| 2015/0122634 | A1 | 5/2015 | Chang |
| 2017/0182574 | A1 | 6/2017 | Kadokura |
| 2023/0066556 | A1 * | 3/2023 | Herrington ......... C23C 18/30 |

FOREIGN PATENT DOCUMENTS

| | | |
|---|---|---|
| EP | 2537635 A1 | 12/2012 |
| JP | 6164611 B2 | 7/2017 |

OTHER PUBLICATIONS

Koyano et al., "Electrochemical machining using porous electrodes fabricated by powder bed fusion additive manufacturing process", CIRP Annals—Manufacturing Technology, vol. 66, No. 1, Elsevier Ltd, May 6, 2017, pp. 213-216.
U.S. Appl. No. 17/661,230, filed Apr. 28, 2022, naming inventors Garner.
U.S. Appl. No. 17/661,246, filed Apr. 28, 2022, naming inventors Garner et al.
U.S. Appl. No. 17/661,483, filed Apr. 29, 2022, naming inventors Gamer et al.
U.S. Appl. No. 17/937,084, filed Sep. 30, 2022, naming inventors Gamer et al.
U.S. Appl. No. 17/937,091, filed Sep. 30, 2022, naming inventors Garner et al.
Machine translation of JP6164611 B2 of Natsu et al (Year: 2017).

* cited by examiner

PULSED ELECTROCHEMICAL MACHINING

TECHNICAL FIELD

The disclosure relates to pulsed electrochemical machining (pECM).

BACKGROUND

Machining processes may involve removal of material from a workpiece to form a component having a finished shape and texture. Pulsed electrochemical machining (pECM) is a non-contact machining process based on the principles of electrolysis. Pulsed electrochemical machining may also be referred to as precision electrochemical machining or pulse electrochemical machining. A pECM system may include a tool (the cathode) that imparts its shape into a workpiece (the anode) in a mirror image. As the tool moves toward a surface of the workpiece to be machined, a pulsed DC current may be applied to the tool and the workpiece. The tool maintains a tiny interelectrode gap (e.g., of less than about 50 microns) from the surface of the workpiece, and the workpiece dissolves anodically about the tool, taking on the complementary shape of the tool. An electrolyte pumped between the tool and the workpiece may remove dissolved metal from the workpiece and heat.

Since the cathodic tool does not physically contact the anodic workpiece, pECM can produce burr-free three-dimensional shapes with little or no tool wear. pECM may be used to machine any conductive metal or alloy, and is particularly well suited for materials, such as superalloys, that are difficult to machine through conventional methods. Materials commonly machined with pECM include, for example, nickel, iron, and titanium-based alloys in a variety of formats such as cast (including single crystal), forged, additively manufactured, and powdered metallurgy.

SUMMARY

In some examples, the disclosure describes a pulsed electrochemical machining (pECM) assembly that includes a tool body defining a tool axis. The tool body includes an electrode, and the electrode includes an electrically conductive material and defines a working surface configured to face a workpiece. The working surface defines a plurality of apertures configured to fluidically couple to an electrolyte system.

In some examples, the disclosure describes a technique for pulsed electrochemical machining a workpiece system that includes generating a pulsed direct current between an electrode of a tool body of a pECM machining assembly and the workpiece. The tool body defines a tool axis, and the electrode includes an electrically conductive material. and defines a working surface at a first end configured to face the workpiece. The technique includes delivering an electrolyte through a plurality of apertures in the working surface into an interelectrode gap between the working surface of electrode and a target surface of the workpiece. The working surface includes a plurality of apertures are configured to fluidically couple to an electrolyte system. The technique includes positioning the working surface of the electrode relative to the target surface of the workpiece to remove material from the target surface of the workpiece.

In some examples, the disclosure describes a pECM assembly that includes a tool body. The tool body includes a manifold block defining at least one electrolyte inlet and at least one electrolyte outlet, a baffle element, and an electrode. The electrode includes an electrically conductive material and defines a working surface configured to face a workpiece. The tool body is configured to receive electrolyte from an electrolyte system at the at least one electrolyte inlet in the manifold block and feed electrolyte through the baffle element to the working surface of the electrode.

In some examples, the disclosure describes a technique for pulsed electrochemical machining a workpiece including generating a pulsed direct current between an electrode of a pECM machining assembly and the workpiece. The machining assembly includes a tool body. The tool body includes a manifold block which defines at least one electrolyte inlet and at least one electrolyte outlet, a baffle element, and an electrode. The electrode includes an electrically conductive material and defines a working surface configured to face a workpiece. The technique includes delivering an electrolyte through the at least one electrolyte inlet in the manifold block and the baffle element to the working surface of the electrode. The technique also includes positioning the working surface of the electrode relative to the target surface of the workpiece to remove material from the target surface of the workpiece.

In some examples, the disclosure describes a pECM system including a pECM machining assembly comprising a tool body. The tool body includes an electrode, and the electrode includes an electrically conductive material. The electrode defines a working surface configured to face a workpiece. The pECM system includes a mechanical system configured to position the working surface of the one or more electrodes relative to the workpiece. The pECM system also includes an electrolyte system configured to supply electrolyte to an interelectrode gap between the working surface of the electrode and a target surface of the workpiece. The electrolyte system includes a vacuum system configured to pull electrolyte from the interelectrode gap through the electrode. The pECM system includes a power supply configured to generate a pulsed direct current between the one or more electrodes of the pECM tool and the workpiece.

In some examples, the disclosure describes a technique for pulsed electrochemical machining (pECM) a workpiece, comprising: generating a pulsed direct current between an electrode of a machining assembly and the workpiece, wherein the machining assembly comprises a tool body defining a tool axis, the tool body comprises an electrode, and the electrode comprises an electrically conductive material and defines a working surface configured to face the workpiece, delivering an electrolyte into an interelectrode gap between the working surface of the electrode and a target surface of the workpiece through an electrolyte system, pulling the electrolyte out of the interelectrode gap using a vacuum system of the electrolyte system; and positioning the working surface of the electrode relative to the target surface of the workpiece to remove material from the target surface of the workpiece.

The details of one or more examples are set forth in the accompanying drawings and the description below. Other features, objects, and advantages will be apparent from the description and drawings, and from the claims.

DETAILED DESCRIPTION

Figure 1A:
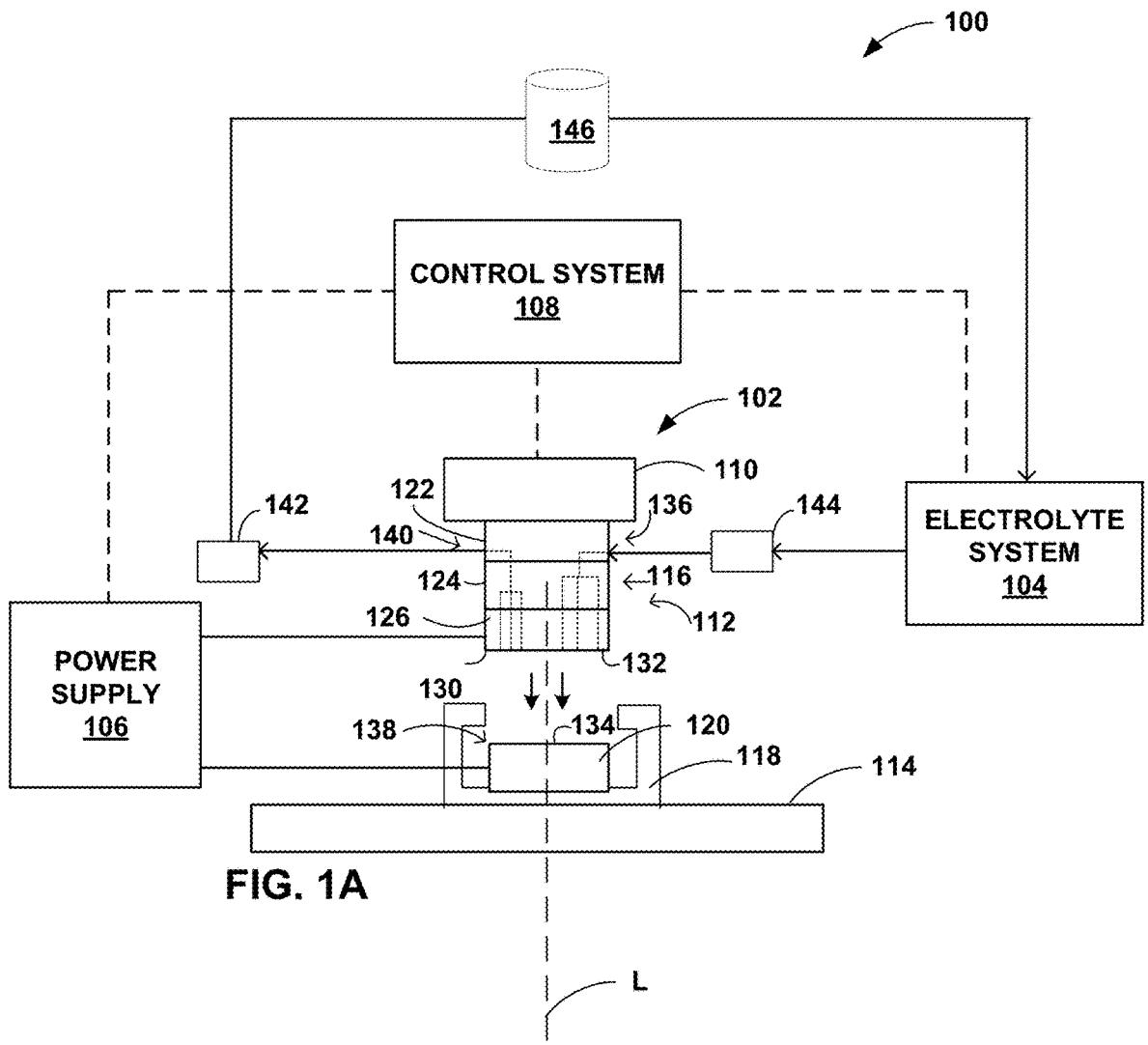
FIG. 1A is a conceptual block diagram illustrating a pulsed electrochemical machining (pECM) system.

The disclosure generally describes techniques, devices, and systems for pulsed electrochemical machining (pECM). In some aspects, the disclosure describes pECM tools, assemblies, systems, and techniques for managing, controlling, and/or distributing the flow of electrolyte through a pECM system.

In one aspect, the disclosure describes a pECM tool which includes flow defining structures (e.g., a plurality of channels such as tubes opening to a plurality of apertures in a working surface) that allow electrolyte to flow through the pECM tool to a working surface of the tool, such that electrolyte may be distributed to along the working surface of the tool to assist in selective machining and/or uniform machining of a workpiece.

In another aspect, the disclosure describes a pECM assembly including a modular tool body including a baffle element, which may be configured to distribute electrolyte into flow defining structures (e.g., a plurality of channels) in an electrode of the pECM assembly. In some examples, such a baffle element may allow for electrolyte to be supplied through a single inlet of the assembly, but then distributed to a plurality of channels within the assembly rather than requiring multiple inlets each corresponding to an individual channel of the plurality of channels.

In another aspect, the disclosure describes pECM system including an electrolyte system which includes a vacuum system. Advantageously, a vacuum system may assist in flowing electrolyte through the pECM system by pulling electrolyte through the pECM system, e.g., via a vacuum pump or vacuum pumps, which may be in combination with one or more additional pumps. In some examples, one or more pumps may be configured to drive the flow of the electrolyte into the pECM assembly while a vacuum system may drive the flow out of the tool, e.g., to allow for "pushing" and "pulling" of the electrolyte in the pECM assembly. In some examples, the vacuum system may include one or more vacuum pumps. Additionally or alternatively, the vacuum system may include an eductor or eductors configured to pull the electrolyte out of the interelectrode gap.

In some examples, the disclosure describes a pECM assembly which includes a tool body which includes at least one electrode that includes a working surface configured to machine a target surface of a workpiece. For ease of description, the pECM assemblies described herein are primarily described as including a single electrode. However, it is contemplated that examples of the pECM tools may alternatively include multiple electrodes. Such an electrode primarily functions as a cathode during a pECM process with the workpiece functioning as the anode. However, it is contemplated that, in some examples, the electrode may be configured to function as an anode during at least some portion of a pECM process with the workpiece functioning as the cathode at times (e.g., in cases in which the electrode and workpiece alternate between functioning as the cathode and the anode). The working surface of the electrode may be configured to face a workpiece, and the working surface may define a plurality of apertures configured to fluidically couple to an electrolyte system. The electrolyte system may feed electrolyte through the electrode into an interelectrode gap between the workpiece and the electrode. As will be discussed further, the plurality of apertures in the working surface may improve distribution of electrolyte across the working surface, which may improve the uniformity of machining across the working surface, relative to pECM tools that provide only a single electrolyte inlet.

In some examples, the electrode may include a plurality of channels extending through the electrode from a first end defining the working surface at least partway through the electrode toward a second end. In some examples, each aperture of the plurality of apertures may correspond to at least one channel of the plurality of channels. Additionally, or alternatively, more than one channel of the plurality of channels may open to one aperture of the plurality of apertures. In some examples, at least one channel of the plurality of channels may be fluidically coupled to an electrolyte inlet. Accordingly, the plurality of channels may allow electrolyte to flow through the electrode and into the interelectrode gap through a plurality of inlets defined by the plurality of apertures of the working surface of the electrode. Electrolyte fed into the interelectrode gap into different areas of the working surface in this manner may improve the accuracy and efficiency of the pECM process by improving electrolyte distribution across the working surface.

In some examples, the electrode may define a second end and a first end defining the working surface, and each aperture of the plurality of apertures corresponds to a channel of a plurality of channels extending through the electrode from the working surface at the first end at least part of the way to the second end. In some examples, at least one channel of the plurality of channels may extend through the electrode from the working surface to the second end.

Similarly, in some examples, at least one channel of the plurality of channels may be fluidically coupled to an electrolyte outlet, which may allow for electrolyte to flow out of the interelectrode gap through the electrode. At least one channel of the plurality of channels through the electrode which is configured to act as an electrolyte outlet may allow for more uniform pressure of electrolyte throughout the interelectrode gap. Additionally, more than one channel of the plurality of channels configured to act as an outlet may improve electrolyte circulation through the electrolyte system. In some examples, as will be discussed in detail below, a vacuum pump may be fluidically coupled to a channel or channels of the plurality of channels configured to act as an outlet. In some examples, fluidically coupling a channel or channels configured to act as an electrolyte outlet to a vacuum pump may improve electrolyte circulation through an electrolyte system. In some examples, improved electrolyte circulation may include increasing the velocity of electrolyte. In some examples, improved electrolyte circulation may assist in keeping the interelectrode gap free of hydrogen gas and/or dissolved material from the anode.

In some examples, the desired geometry of the workpiece after pECM machining of the workpiece with pECM process may include a complex geometry, which may not be suitable for a system which has only a single electrolyte inlet into the interelectrode gap and/or a single electrolyte outlet out of the interelectrode gap. For example, the target surface of the workpiece may include a textured portion (e.g., a honeycomb portion) and or define any number of channels, ribs, or slots. In some examples, distribution of electrolyte into the interelectrode gap through a plurality of apertures defined in the working surface of the electrode may allow for the target surface of the workpiece to more closely mirror the working surface of the working machining tool, because electrolyte may be evenly distributed across the working surface. Where deep channels or other features are desired in the target surface, a pECM machining tool according to the present disclosure which distributes electrolyte flow across the working surface may assist in more accurately forming the features through pECM machining, relative to other pECM machining tools.

In some examples, the electrode of the tool may be at least partially formed through additive manufacturing. For example, at least part of the electrode may be formed by a suitable powder bed metal fusion technique. Without intent to be limiting, suitable additive manufacturing techniques may include direct metal laser sintering (DMLS), electron beam melting (EBD), directed energy deposition (DED), selective laser melting/selective laser sintering (SLM/SLS), laser metal fusion (LMF) binder jetting, and/or combinations thereof, or like.

In some examples, flow defining structures that assist in distribution and/or flow of electrode (e.g., channels) through the electrode may be more easily formed through an additive manufacturing process, allowing for more uniform and/or more selective distribution of flow to the interelectrode gap. In some examples the electrode may be additively manufactured in a single complete piece (e.g., electrode is a single unitary piece that includes all the apertures rather than multiple pieces each having one aperture).

The electrode includes an electrically conductive material. In some examples, the electrically conductive material may be a metal, metal alloy, or a ceramic material.

In some examples, a plurality of apertures in the working surface configured to fluidically couple to an electrolyte system may improve electrolyte flow through the electrode, improving electrolyte access to certain areas. For example, the working surface may define a textured pattern (e.g., honeycomb pattern), and the apertures may provide for improved electrolyte access to the centers of the honeycomb pattern. In some examples, at least some of the plurality of apertures defined in the working surface may be configured to inlet electrolyte into the interelectrode gap in non-critical areas of the working surface (e.g., away from a pattern area of the working surface). In some examples, at least some of the plurality of apertures may be configured to give the target surface of the workpiece a texture (e.g., a roughness).

In some examples, at least some of the plurality of apertures may be configured to inject and/or inlet electrolyte such that the electrolyte is configured to act as a cutting element (e.g., a fluid jet). In some examples, the pECM tool body may be configured to orbit the electrode to eliminate positives or other undesirable texture from the target surface of the workpiece.

In some examples, a pECM tool according to the present disclosure may be configured to include multiple electrodes (e.g., different electrodes in succession) during the pECM process. For example, in some examples a first electrode (e.g., a rough electrode) may be configured to remove a relatively large amount of material to pECM the workpiece from an initial shape (e.g., a block) to a rough shape (e.g., a rough outline of the desired final shape of the workpiece). In some examples, a second electrode may replace the first electrode (e.g., within a tool body including a manifold block and/or mechanically coupled flow block). The second electrode may be configured to remove a relatively small amount of material from the workpiece (e.g., more precisely compared to the first electrode) from the rough shape to the desired final shape of the workpiece. Any suitable number of electrodes may intervene between the first electrode and the second electrode.

In some examples, the pECM tool body may be configured to mechanically support the first electrode and the second electrode interchangeably. A pECM tool configured to support a first roughing electrode followed by a second finishing electrode may be desirable to reduce or eliminate the influence of the original shape of the workpiece (e.g., a block) on the final shape of the workpiece. Additionally, or alternatively, at least one apertures of the plurality of apertures defined by the working surface of an electrode may be plugged or covered to selectively modify the electrolyte flow pathways in the electrode to tailor the material removal even with the same electrode. In this way, the pECM assembly may allow an operator to change from a roughing step to a finishing step, or vice versa, using the same electrode.

In some examples, a pECM assembly according to the present disclosure may improve distribution of electrolyte across the interelectrode gap. For example, the size and/or distribution of the plurality of apertures may be tailored to provide for a desired electrolyte distribution. In some examples, the plurality of apertures defined by the working surface may be evenly distributed, which may provide for even distribution of electrolyte into the interelectrode gap. In some examples, the plurality of apertures defined by the working surface may be evenly distributed, which may provide for selective flow of electrolyte to desired areas of the working surface of the electrode.

In some examples, electrolyte delivered to the perimeter or edge areas of the working surface may tend to evacuate the interelectrode gap more quickly than electrolyte delivered to a central area. In some examples, the pECM tool may be configured to deliver more electrolyte to a central area of the working surface than the perimeter area of the working surface, which may improve accuracy or uniformity of the pECM process. In some examples, the working surface includes a central portion of the working surface and a perimeter portion of the working surface. In some examples, the surface area of the central portion may be approximately equal to the surface area of the perimeter portion, and the central portion may be configured to deliver a greater volume of electrolyte to the interelectrode gap than the perimeter portion. For example, in some examples, the central portion may define more aperture area per unit total area than the perimeter portion.

In some examples, the electrode may define the working surface at the first end and a second end, and each aperture of the plurality of apertures may correspond to a channel of a plurality of channels extending from the first end of the electrode to the second end of the electrode. Each channel of the plurality of channels may define a minimum cross-sectional area, and at least one first channel of the plurality of channels may open at the first end in the central portion of the working surface and at least one second channel of the plurality of channels open at the first end in the perimeter portion of the working surface. In some examples, each first channel of the at least one first channel opening into the central portion of the working surface defines a larger minimum cross-sectional area than each second channel of the at least one second channel opening into the perimeter portion of the working surface In some examples, the central portion of the working surface may be configured to deliver a greater volume of electrolyte to the interelectrode gap than the perimeter portion by defining larger channels of the plurality of channels in the central portion than in the perimeter portion. For example, in some examples, each aperture of the plurality of apertures may correspond to a channel of the plurality of channels. Each channel may define a minimum cross-sectional area, and at least one channel may open at the first end in the central portion and at least one channel may open at the first end in the perimeter portion of the working surface. Each channel of the plurality of channels opening into the central portion of the working surface may have a larger minimum cross-sectional area than each channel of the plurality of channels that opens into the perimeter portion of the working surface.

The pECM assembly may be configured to circulate some or all of the electrolyte through the electrolyte system and the electrode. In some examples, the tool body may be configured to form a seal around at least a portion of the perimeter of the interelectrode gap when mechanically coupled to a flow block. In some examples, the tool body may be configured to form a seal around the entire perimeter of the interelectrode gap when mechanically coupled to the flow block. In some examples, the workpiece may be configured to form or be a component of the seal.

In some examples, the disclosure describes a modular pECM assembly. A modular pECM assembly may include a tool body made up of different components. The components, in some examples, may be interchangeable or tunable to impart different characteristics to the workpiece and/or change the machining rate or location of machining on the workpiece. In this way, a machining assembly may allow for selective machining of the workpiece. A modular pECM assembly may be desirable where workpieces of various shapes, sizes, surface finishes, or the like are to be machined using the pECM assembly.

For example, a tool body according to the present disclosure may include, in addition to the electrode comprising an electrically conductive material and defining a working surface configured to face a workpiece, a manifold block defining at least one electrolyte inlet and at least one electrolyte outlet. In some examples, the tool body may include a baffle element. In some examples, the tool body may be configured to receive electrolyte from an electrolyte system at the at least one electrolyte inlet in the manifold block and feed electrolyte through the baffle element to the working surface of the electrode. In some examples, the baffle element may be replaced and/or interchangeable to affect flow of electrolyte through the electrode to the working surface to selectively modify electrolyte flow pathways through the assembly, and thus selectively modify material removal from the target surface of the workpiece during the pECM process. In some examples, a baffle element may allow for the electrode to be designed for a maximum electrolyte flow scenario and the baffle element may allow for drop-in, insertable and/or interchangeable baffles which may tune, change, and/or selectively modify flow of electrolyte from the manifold block through the electrode to the working surface. In some examples, a baffle element included in the pECM assembly may reduce or eliminate the need for valving in the electrolyte system.

In some examples, the baffle element may be configured to be disposed between the manifold block and the electrode in the pECM assembly. For example, in some examples, the electrode may be configured to receive and mechanically support the baffle element. In some examples, the electrode may define a recess configured to receive the baffle element. In some examples, a pECM tool may include a series of baffle elements (e.g., a first baffle element and a second baffle element), and each of the baffle elements configured to be received and mechanically supported by the electrode. In this way, a series of baffle elements may be interchangeable and changed out to affect or tune electrolyte flow through the electrode. In this way, a pECM tool may be configured to be modular such that different electrodes and/or different baffle elements may be swapped in and out to modify electrolyte flow based on the desired level of material removal, desired shape of the workpiece, or the like, by changing the way the at least one electrolyte inlet of the manifold block is fluidically coupled to the apertures defined by the working surface of the electrode.

In some examples, the baffle element may be configured to distribute or assist in distribution of electrolyte into at least one of the plurality of channels in the electrode. In some examples, the baffle element may include a reservoir, which may assist in equalizing flow of electrolyte across the baffle element and into one or more the plurality of channels in the electrode. In some examples, the baffle element may define a baffle element aperture through the baffle element corresponding to each channel of the plurality of channels in the electrode. In some examples, the baffle element may define a different number of baffle element apertures through the baffle element than the number of channels in the plurality of channels defined by the electrode. In some examples, the pECM machining tool may include at least one channel plug configured to prevent or reduce flow of electrolyte through at least one channel of the plurality of channels defined by the electrolyte.

In some examples, the pECM assembly may be configured to flow electrolyte from the working surface to the at least one electrolyte outlet defined by the manifold block. In some examples, both the electrode and the baffle element define at least one path configured to be fluidically coupled to the electrolyte outlet. In some examples, the baffle element may define an inlet portion and an outlet portion. The inlet portion may define a plurality of apertures through the baffle element may be configured to distribute electrolyte into more than one of the plurality of channels define by the electrode. The outlet portion may define at least one aperture configured to fluidically couple to the at least one outlet of the manifold block. Accordingly, the pECM tool may be configured to circulate electrolyte through the electrolyte system. For example, an electrolyte flow path may be defined from an electrolyte storage tank to the at least one electrolyte inlet of the manifold block and through the baffle element. The baffle element may distribute electrolyte into one or more channels of the plurality of channels in the electrode through the electrode and out of plurality of apertures in the working surface of the electrode into the interelectrode gap. The fluid path may define a path back out of the tool body through at least one outlet channel in the electrode, at least one outlet baffle element aperture through the baffle element, and the at least one outlet defined by the manifold block back to the electrolyte storage tank. In some examples, circulating electrolyte from the electrolyte system to the interelectrode gap though the pECM assembly may reduce or eliminate system complexity (e.g., accessory components to manage electrolyte flow into the interelectrode gap) relative to other pECM systems, because the pECM assembly may simultaneously manage electrolyte flow through the flow structures of the electrode and act as the machining tool.

In some examples, the pECM assembly may include a flow block. In some examples, the flow block may be configured to be mechanically coupled to the workpiece (e.g., temporarily during the pECM process. In some examples, the baffle element and the flow block may be configured to be disposed between the manifold block and the flow block. In some examples, the electrode and the manifold block may be configured to form a seal around at least a portion of a perimeter of the baffle element. In this way, the system complexity may be reduced because electrolyte flow may be managed and substantially contained by the pECM assembly, rather than requiring additional piping, valving, and the like.

In some examples, the baffle element may be at least partially formed through additive manufacturing (e.g., completely formed in one piece following the additive manufacturing process). In some examples, the baffle element may comprise any suitable polymer material, such as, for example, a plastic. Accordingly, a relatively simple and elegant modular pECM assembly including a baffle element (or interchangeable baffle elements) to improve, modify, and/or tune electrolyte flow through the pECM assembly is provided in some examples of the disclosure.

In some examples, pECM assemblies according to the present disclosure may be part of a larger system for pECM machining. In some examples, the pECM system may include a mechanical system configured to position the working surface of the electrode relative to the workpiece. In some examples, as mentioned above, the pECM system may include an electrolyte system configured to supply electrolyte into the interelectrode gap between the working surface of the electrode and the target surface of the workpiece. The pECM system may also include a power supply configured to generate a pulsed direct current between the electrode of the pECM tool and the workpiece.

In some examples, the electrolyte system may include a vacuum system. In some examples, the vacuum system may include a vacuum pump, which may be fluidically coupled to the pECM assembly. The vacuum pump may be in addition to one or more positive displacement pumps, centrifugal pumps, or the like also included in the electrolyte system. The vacuum pump may be fluidically coupled to an outlet of the interelectrode gap, which in some examples may be one or more apertures defined in the working surface of the electrode. Additionally or alternatively, the vacuum system may include an eductor, which may be configured to pull electrolyte out of the interelectrode gap via a venturi phenomenon. Inclusion of a vacuum system (e.g., vacuum pump(s) and/or eductors) in the electrolyte system may assist in flowing electrolyte through the electrolyte system. For example, the vacuum system may assist in removing hydrogen gas and/or dissolved material from the anode out of the interelectrode gap and through electrolyte system, reducing the presence of undesired materials in the interelectrode gap.

An electrolyte system including a vacuum system may be desirable for certain types of workpieces. For example, a vacuum system may improve electrolyte flow where the workpiece includes a surface pattern or texture, by assisting in electrolyte flow across or out of the pattern or texture. For similar reasons, inclusion of a vacuum pump may be advantageous where the workpiece includes surface features (e.g., ridges, protrusions, channels, or the like) across areas of the targets surface. A vacuum system may be advantageous where relatively deep and/or long channels are defined in the target surface by the working surface, which may include at least one protrusion configured to define a recess in the target surface of the workpiece after machining of the workpiece. In some examples, the at least one protrusion defined by the working surface may define depth dimension and a length dimension, and the length dimension may have greater magnitude than the depth dimension. A vacuum system included in the electrolyte system of a pECM system including such an electrode working surface may be desirable because the vacuum system may assist in flowing electrolyte across or out of a depression or recess in the workpiece.

In some examples, the electrolyte system may include an electrolyte storage tank. In some examples, a vacuum pump of the vacuum system may be disposed between an electrolyte outlet of the machining assembly (e.g., a manifold block outlet) and the electrolyte storage tank. In some examples, the electrolyte system may also include a second pump (e.g., a pump in addition to a vacuum pump) disposed between the electrolyte storage tank and an electrolyte inlet of the pECM machining tool (e.g., a manifold block inlet). In this way, the pECM system may include an electrolyte system configured to drive the flow of the electrolyte into the pECM assembly while the vacuum pump may drive the flow out of the tool, e.g., to allow for "pushing" and "pulling" of the electrolyte in the pECM assembly.

In some examples, the pECM assembly includes a tool body. In some examples, the tool body may be made up of the manifold block, the baffle element, and the electrode. The tool body may define a tool axis. In some examples, the tool axis may be a central axis of the tool body. In some examples, as mentioned above, a channel defined by the electrode may be fluidically coupled to the vacuum system. In some examples, the channel fluidically coupled to the vacuum system (e.g., a vacuum pump) may overlap and/or be coincident with the tool axis. It may be desirable to pull a vacuum at or near the center of the electrode in this way to evacuate undesired materials (e.g., hydrogen gas, dissolved anodic material, or the like) from the interelectrode gap.

FIG. 1A is a schematic conceptual block diagram illustrating an example pulsed electrochemical machining (pECM) system 100 for machining workpiece 120. pECM system 100 includes mechanical system 102, electrolyte system 104, power supply 106, and control system 108. While illustrated as separate components, the various components of pECM system 100 may be integrated with other components (e.g., power supply 106 incorporated into mechanical system 102) or overlap with other components (e.g., controllers of mechanical system 102 overlapping with control system 108). While examples of the disclosure are described primarily with regard to pulsed electrochemical machining processes performed by pECM system 100, other examples of the disclosure may be employed using other machining techniques that employ electrochemical machining to shape or otherwise selectively remove material from a workpiece.

Mechanical system 102 may include actuation system 110, machining assembly 112, flow block 118, and enclosure system 114. Actuation system 110 may be configured to control a position of machining assembly 112 relative to workpiece 120. During a pECM process, actuation system 110 may adjust the position of machining assembly 112 relative to workpiece 120 as needed by moving machining assembly 112, workpiece 120, or both. Actuation system 110 may include one or more actuators, such as direct drive actuators, configured to move machining assembly 112 and/or workpiece 120 as desired during a pECM process. For examples, one or more actuators may be configured to feed or otherwise move machining assembly 112 toward workpiece 120 during a pECM process. In some examples, actuation system 110 may be configured to oscillate machining assembly 112 (e.g., along the z-axis shown in FIGS. 1B and 1C). Such movement of machining assembly 112 by actuation system may improve removal of dissolved material and restore a concentration of electrolyte between machining assembly 112 and workpiece 120. As illustrated in the example of FIG. 1A, machining assembly 112 may be configured to receive electrolyte from electrolyte system 104 and discharge the electrolyte to or proximate to machining assembly 112.

Machining assembly 112 may be configured to mechanically couple to actuation system 110, electrically couple to power supply 106, and fluidically couple to electrolyte system 104. As will be discussed in further detail below, machining assembly 112 includes tool body 116, which includes manifold block 122, baffle element 124, and electrode 126. In some examples, machining assembly 112 may also include flow block 118. Tool body 116 defines tool axis L along a central axis of tool body 116 extending from tool body second end 128 (away from workpiece 120, up in the z-direction of FIG. 1B) to tool body first end 130 (toward workpiece 120, down in FIG. 1B). Electrode 126 defines working surface 132 configured to face workpiece 120 and machine target surface 134 of workpiece 120. In some examples, as illustrated, working surface 132 may be defined by tool body first end 130.

For example, machining assembly 112 may include one or more structures or assemblies to couple to actuation system 110, such that machining assembly 112 receives a control force for positioning machining assembly 112 and electrical current for generating an electric potential between machining assembly 112 and workpiece 120. Electrolyte from electrolyte system 104 may be fed through at least one inlet 136 in manifold block 122 of tool body 116 and flow through baffle element 124 and electrode 126 for discharging from machining assembly 112, as will be described further in FIGS. 1B and 1C below. Machining assembly 112 may be configured to define working surface 132, which defines a plurality of apertures for distribution of electrode into interelectrode gap 138, as will be describe in further detail below. The electrical potential between machining assembly 112 and workpiece 120, in combination with the electrolyte supplied by electrolyte system 104, forms an electrolytic cell that dissolves material from the target (e.g., outer) surface 134 of workpiece 120 using electrolysis.

Enclosure system 114 may be configured to mount flow block 118, and flow block 118 may be coupled to and/or mechanically support workpiece 120 and electrically couple workpiece 120 to power supply 106 for generating a voltage between machining assembly 112 and workpiece 120 (e.g., in the form of a pulsed direct current). For example, flow block 118 may position workpiece 120 toward machining assembly 112, such that a working surface of workpiece 120 is exposed to a working surface of machining assembly 112. In some examples, enclosure system 114 may capture spent electrolyte from workpiece 120 for return to electrolyte system 104. However, in some examples, machining assembly 112 may, as described above, be configured to flow electrolyte to and from the interelectrode gap, such that enclosure system 114 need not capture and return spent electrolyte because electrolyte remains contained by machining assembly 112 and workpiece 120 and/or machining assembly 112 and flow block 118, which may be mechanically coupled to the other components of machining assembly 112 and configured to act as a component of machining assembly 112. Although illustrated and described as separate elements, in some examples flow block 118 and enclosure system 114 may be the same element, or only flow block 118 or enclosure system 114 may be included and its function provided by the other element.

Electrolyte system 104 may be configured to condition and circulate electrolyte (e.g., liquid electrolyte) for distribution to working surface 132 of machining assembly 112. Electrolyte system 104 may include vacuum system 142 (e.g., a vacuum pump and associated piping/equipment) and/or one or more pumps 144 configured to discharge the electrolyte to interelectrode gap 138 (not illustrated to scale in FIG. 1A), one or more filters configured to filter contaminants from the electrolyte (e.g., for the re-use of electrolyte in the pECM process), one or more heat exchangers configured to remove heat from the electrolyte, and/or other components configured to maintain various parameters of the electrolyte. Electrolyte system 104 may also include electrolyte storage tank 146, which may store electrolyte to be supplied to interelectrode gap 138, and may receive electrolyte returned from at least one outlet 140 in manifold block 122. Vacuum system 142 may assist in circulating electrolyte through electrolyte system 104 by pulling electrolyte, which may contain dissolved gases and metal from workpiece 120, out of interelectrode gap 138. Vacuum system 142 is primarily described below as including one or more vacuum pumps, in some examples vacuum system 142 may not necessarily include a vacuum pump. For example, additionally or as an alternative to a vacuum pump, vacuum system 142 may include an eductor or eductors. An eductor may be configured to pull electrolyte out of the interelectrode gap by passing a relatively high velocity stream of the electrolyte system through an eductor and pulling the electrolyte out of the interelectrode gap via the Venturi effect.

Power supply 106 may be configured to generate an electric potential between machining assembly 112 and workpiece 120. For example, power supply 106 may be configured to apply a voltage between machining assembly 112 and workpiece 120 to generate current flow between machining assembly 112 and workpiece 120 with the electrolyte flowing or otherwise present between machining assembly 112 and workpiece 120. For a pECM process, power supply 106 may be configured to supply voltage in pulses, such as in combination with oscillations of machining assembly 112 relative to workpiece 120, to increase local current density. For example, power supply 106 may include a direct current (DC) source that applies a pulsed direct current to both machining assembly 112 and workpiece 120 during the pulsed electrochemical machining process. In some examples, actuation system 110 may oscillate the position of machining assembly 112 relative workpiece 120 in coordination with the pulsed direct current.

Control system 108 may be communicatively coupled to mechanical system 102, electrolyte system 104, and power supply 106, and configured to send control signals to mechanical system 102, electrolyte system 104, and power supply 106. For example, the control signals may cause mechanical system 102 to control (e.g., dynamically) a position of machining assembly 112 relative to workpiece 120, cause electrolyte system 104 to supply electrolyte to interelectrode gap 138 between machining assembly 112 and workpiece 120, and cause power supply 108 to generate an electric potential between machining assembly 112 and workpiece 120. Further operation of control system 108 will be described in FIG. 1D below.

Figure 1B:
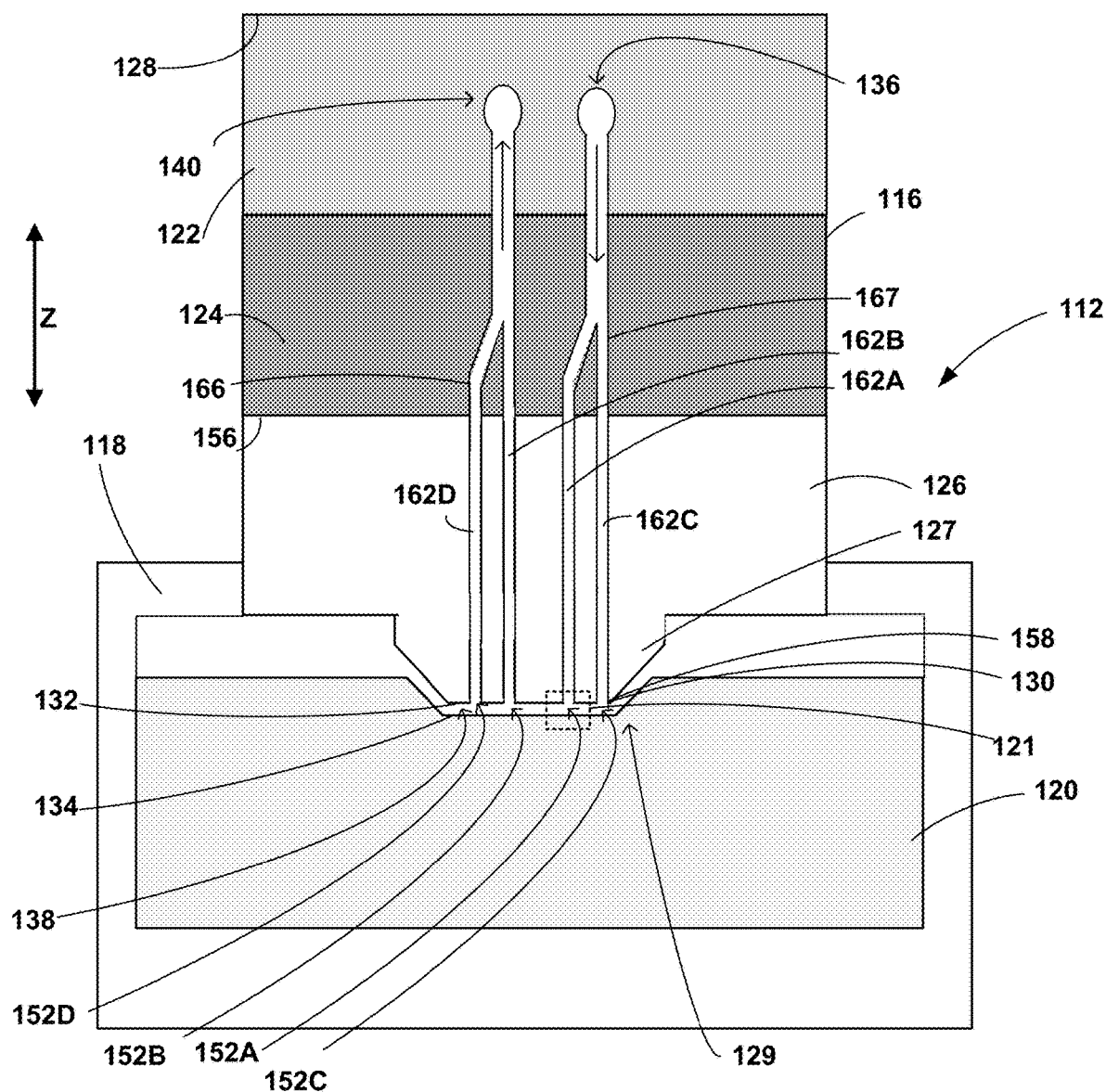
FIG. 1B is a side view cross-sectional conceptual diagram illustrating operation of a pECM tool of the pECM system of FIG. 1A.

Machining assembly 112 defines working surface 132 that forms workpiece 120 into a component having a particular shape or set of dimensions (e.g., approximately the complimentary shape of machining assembly 112). FIG. 1B is a side view cross-sectional conceptual diagram illustrating operation of machining assembly 112 of pECM system 100 of FIG. 1A. Machining assembly 112 includes a tool body 116 defining a tool axis (L, FIG. 1A, not illustrated in FIG. 1B for clarity) that aligns with an axis of actuation system 110 of FIG. 1A. Tool body 116 includes one or more electrodes 126 (one or more cathodes). While illustrated in FIG. 1B as including a single electrode 126, tool body 116 may include multiple electrodes 126, as mentioned above. Each electrode 126 defines a working surface 132. In some examples, working surface 132 may be disposed at a first end of the tool axis. When machining assembly 112 is attached to actuation system 110, each working surface 132 is configured to face a corresponding target surface 134 of workpiece 120.

In some examples, such as illustrated in FIG. 1B, working surface 132 defines a apertures 152A-152D (collectively referred to as apertures 152 or plurality of apertures 152), which may be fluidically coupled to electrolyte system 104. Electrode 126 defines electrode second end 156 and electrode first end 158 with individual channels 162A-162D (collectively referred to as channels 162 or plurality of channels 162). In some examples each respective aperture 152A-D of plurality of apertures 152 may correspond to a channel 162A-D, respectively, of a plurality of channels 162 in electrode 126. Each respective channel 162A-D may extend at least partway from electrode first end 158 to electrode second end 156 (e.g., all the way through electrode 126 from electrode first end 158 to electrode second end 156). In some examples, channel 162A and channel 162C may be configured to fluidically couple to electrolyte inlet 136 of manifold block 122 of tool body 116. Baffle element 124 may be disposed between manifold block 122 and electrode 126, and may spread (e.g., split a stream of electrolyte) or control flow of electrolyte into channels 162A and 162C of plurality of channels 162 in electrode 126. Stated similarly, baffle element 124 may define more electrolyte outlets than inlets. In this way, a modular tool body 116 may be configured to distribute electrolyte across working surface 132 to improve and/or assist in uniform material removal from target surface 134. In the example of FIG. 1B, channel 162A and channel 162C are fluidically coupled to electrolyte inlet 136 in manifold block 122 by way of bifurcated channel 167 in baffle element 124. Bifurcated channel 167 is configured to receive one inlet stream of electrolyte from electrolyte inlet 136 and increase the number of streams to a greater number of streams (from one to two in the example of FIG. 1B).

At least one channel of plurality of channels 162 in electrode 126 may be fluidically coupled to electrolyte outlet 140 in manifold block 122. In the example of FIG. 1B, channel 162B and channel 162D are fluidically coupled to electrolyte outlet 140 in manifold block 122 by way of bifurcated channel 166 in baffle element 124. Baffle element 124 is positioned to intervene between electrode 126 and manifold block 122, as described above. Bifurcated channel 166 receives the two inlet flow streams from channels 162B and 162D and reduces the multiple streams to a lesser number of streams (from two to one in the examples of FIG. 1B). Electrolyte outlet 140 may be coupled to a vacuum system 142 of electrolyte system 104, as mentioned above. Accordingly, tool body 116 may be a modular assembly comprising manifold block 122, baffle element 124, and electrode 126, and the components may function together to manage electrolyte flowing through tool body 116 into and out of interelectrode gap 138.

Additionally, or alternatively, in some examples, electrode 126 may be at least partially formed from a porous material, such as a porous metal. The porous material may fluidically couple one or both of electrolyte inlet 136 and/or electrolyte outlet 140 with working surface 132 through a plurality of interconnected pores. In some examples, it may be desirable to substantially equalize flow of electrolyte through apertures 152. In some examples. electrode 126 including a porous metal may assist in substantially equalizing flow out of each aperture 152A of apertures 152.

Each electrode 126 includes an electrically conductive material at working surface 132. Likewise, workpiece 120 may be an electrically conductive material. When an electric potential (e.g., in the form of a pulse direct current) is generated between working surface 132 of electrode 126 and target surface 134 of workpiece 120 (e.g., with power supply under the control of control system 108), working surface 132 may form a cathode surface and target surface 134 may form an anode surface. As working surface 132 is advanced and material from workpiece 120 is removed, a shape of target surface 134 may generally correspond to the complimentary shape of working surface 132. While the shape of workpiece 120 is shown to mirror the shape of electrode 126 in FIG. 1B, in other examples, the dimensions and shape formed in workpiece 120 from the removal of material from workpiece 120 do not exactly mirror the shape of the machining assembly 112. In some examples, a texture (e.g., a honeycomb pattern), complex shape (e.g., a curved or curvilinear shape), series of grooves or channels (e.g., a slot), or the like are to be pulsed electrochemical machined into target surface 134 during pECM processing. pECM tools and systems according to the present disclosure may be especially desirable in such instances because the modular system may allow for interchange of components (e.g., baffle element 124 or electrode 126) between workpieces 120 of different shapes and sizes, or between a first portion of the machining process where a rough workpiece 120 is created and a second portion of the machining process where a final workpiece 120 is created. Furthermore, a machining assembly 112 which is configured to deliver electrolyte into interelectrode gap 138 through a plurality of apertures 152 at working surface 132 may allow for equal and/or selective distribution across working surface 132. In some examples, working surface 132 of electrode 126 may define at least one protrusion 127 configured to define a recess 129 in target surface 134 of workpiece 120 after machining of workpiece 120. In some examples, at least one protrusion 127 may define a depth dimension and a length dimension, and the length dimension may have greater magnitude than the depth dimension.

The conductive materials of electrode 126 and workpiece 120 may be any suitable conductive material such as metal, metal alloy, or ceramic material. Examples of metals that may be used to form the workpiece 120 and the electrode 126 of machining assembly 112 include nickel, iron, and titanium-based alloys in a variety of formats such as cast (including single crystal), forged, additively manufactured, and powdered metallurgy. Examples of suitable metals and metal alloys for the workpiece 120 and electrode 126 of pECM machining assembly 112 include, but are not limited to, any superalloy such as CMSX-4, MarM247, Haynes 230, Rene N-5, MP35N, and the like, steels such as 4140, A2 tool steel, M4 tool steel, and gear steels such as Ferrium C64, A1 6061, A1 7075, brass, bronze, CoCr, Cu, Ge, Inconels such as 625, 718, and 740h, Mo, Ni, Nitinol, Nitronic 60, Pyrowear 53, stainless steels such as 17-4, 304, 316, and 440C, Ti Grade 1-5, Ti 64, TiAl, and mixtures and combinations thereof.

In some examples, workpiece 120 is a nickel superalloy such as CMSX-4 (also referred to as Cannon Muskegon Single Crystal 4th mix)(available from Cannon Muskegon Corporation, Muskegon MI, USA) or other single crystal alloys. The nickel superalloy may have a composition including Chromium (e.g., about 5.5 weight (wt %) to about 7.5 wt %), Cobalt (e.g., about 9 wt % to about 11 wt %), Molybdenum (e.g., about 0.3 wt % to about 0.9 wt %), Tungsten (e.g., about 5 wt % to about 7 wt %), e.g., with the balance being nickel. In some examples, such a nickel superalloy may also include Titanium (e.g., about 0.5 wt % to about 1.5 wt %), Hafnium (e.g., about 0 wt % to about 0.2 wt %), Tantalum (e.g., about 5.5 wt % to about 6.5 wt %), Rhenium (e.g., about 2 wt % to about 4 wt %), and/or Rhenium (e.g., about 2 wt % to about 4 wt %) in trace amounts. In some examples, the workpiece 120 may be single crystal nickel-based superalloy comprising about 5.5 wt. % to about 7.5 wt. % chromium, about 8 wt % to about 11 wt % cobalt, and about 5 wt. % to about 7 wt % tungsten, e.g., further comprising at least one of about 0.3 wt % to about 0.9 wt % molybdenum, about 0.5 wt % to about 1.5 wt % titanium, about 5.5 wt % to about 7.5 wt % tantalum, about 5.0 wt % to about 6 wt. % aluminum, about 2 wt % to about 4 wt % rhenium, and/or up to about 0.5 wt % hafnium, e.g., with a remainder being nickel. A pECM process to machine such a superalloy workpiece 120 may beneficially include the periodic reversal of polarity of the delivered pulses with electrode 122 being the anode and workpiece 120 being the cathode.

Figure 1C:
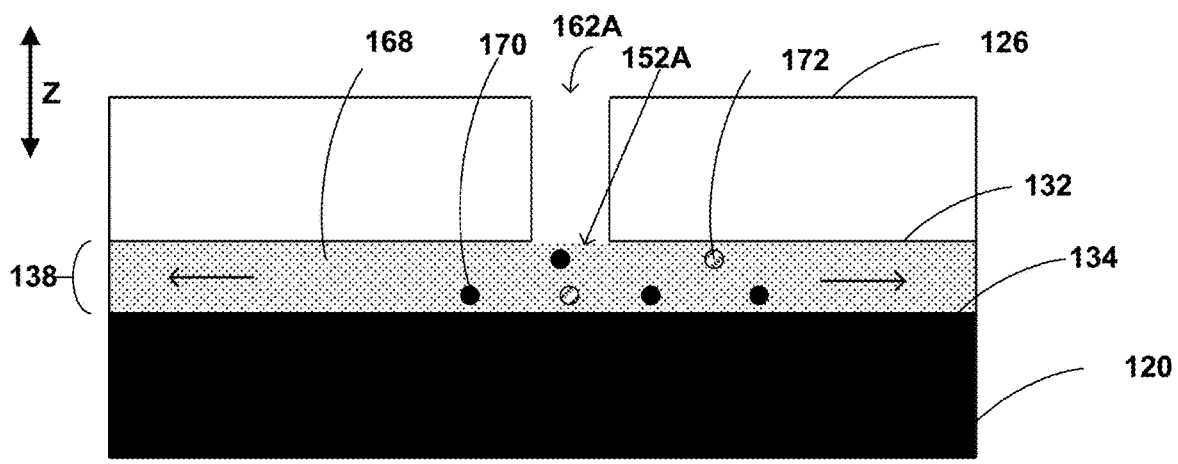
FIG. 1C is a side view cross-sectional conceptual diagram illustrating a magnified view of a portion of FIG. 1B.

FIG. 1C is a side view cross-sectional conceptual diagram showing a magnified view within window 121 indicated in FIG. 1B to illustrate operating principles of the pECM machining assembly of FIG. 1B. Working surface 132 of electrode 126 is positioned relative to target surface 134 of workpiece 120 to form an interelectrode gap 130, and electrolyte 168 flows through channel 162A into interelectrode gap 130 through aperture 152A defined in working surface 132. When an electric potential (e.g., in the form of a pulse direct current) is generated between working surface 132 and target surface 134, current flows from working surface 132 to target surface 134 via electrolyte 168 to form an electrolytic cell. The current dissolves material at target surface 134 to generate electrochemical reaction products that include dissolved material 170, hydrogen gas 172, and heat. Electrolyte 168 carries away the electrochemical reaction products from interelectrode gap 138. In general, the material removal rate may be related to current density in interelectrode gap 138. The current density in interelectrode gap 138 may be related to a variety of parameters including, but not limited to: spatial parameters, such as a distance of interelectrode gap 138; electrical parameters, such as an electric potential across interelectrode gap 138; electrolyte parameters, such as a flow rate of electrolyte 138; flow velocity of electrolyte 168 through electrolyte system (104, FIG. 1A) and other parameters that may affect flow of current from working surface 132 to target surface 134.

Figure 1D:
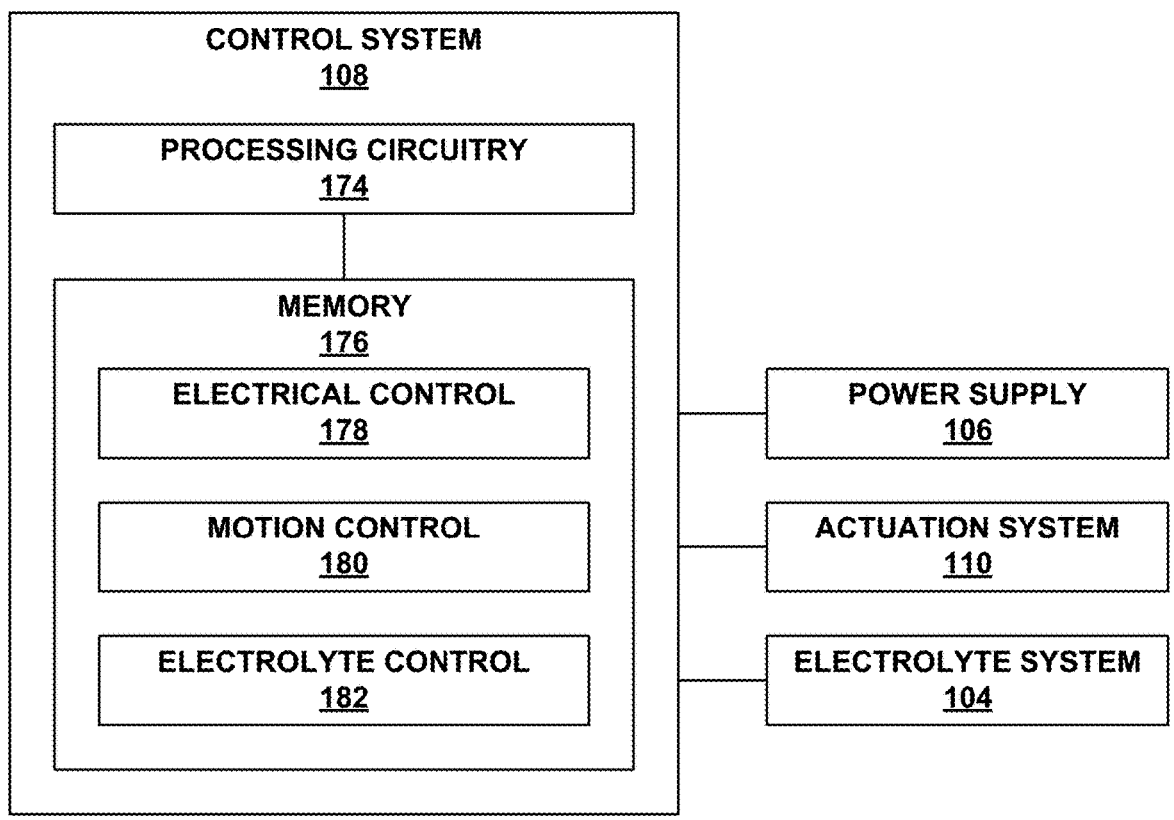
FIG. 1D is a conceptual block diagram illustrating an example control system of the pECM system of FIG. 1A.

FIG. 1D is a conceptual block diagram illustrating an example control system 108 of pECM system 100 of FIG. 1A. Control system 108 includes processing circuitry 174 and a memory 176. Memory 176 includes computer-readable instructions that, when executed by processing circuitry 174, causes processing circuitry 174 to perform various functions related to control of components of pECM system 100. Processing circuitry 174 may include any one or more microprocessors, controllers, digital signal processors (DSPs), application specific integrated circuits (ASICs), field-programmable gate arrays (FPGAs), or equivalent discrete or integrated digital or analog logic circuitry, and the functions attributed to processing circuitry 174 herein may be embodied as software, firmware, hardware or any combination thereof. Memory 176 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Memory 176 may store any suitable information, including information for executing one or more electrochemical machining processes with which pECM system 100 performs on workpiece 120. For example, memory 176 may store one or more of electrical control instructions 178, motion control instructions 180, and electrolyte control instruction 182 in separate memories within memory 176 or separate areas within memory 176. Electrical control 178, motion control 180, and electrolyte control 182 may, in combination, define parameters that control pECM system 100 to remove material from workpiece 120 to generate a component having particular dimensions. In some examples, workpiece 120 may be a partially fabricated component having relatively rough dimensions, such that the pECM process may further refine workpiece 120 to relatively fine dimensions.

Electrical control 178 may define values for electrical parameters of a pECM process including, but not limited to, voltage amplitude applied to electrode 126 and workpiece 120, frequency of electric current, duty cycle (e.g., pulse length), current amplitude, and other electric parameters associated with control of current across interelectrode gap 138. Processing circuitry 176 may generate and send control signals that include the electrical parameters to electrical control circuitry of power supply 106.

Motion control 180 may define values for motion parameters of a pECM process including, but not limited to, feed rate of machining assembly 112, position of machining assembly 112 (e.g., depth limit of machining assembly 112), frequency of oscillation of machining assembly 112, amplitude of oscillation of machining assembly 112, length of interelectrode gap 138, and other motion parameters associated with control of relative and/or time-varying position of working surface 132. Processing circuitry 176 may generate and send control signals that include the motion parameters to actuation circuitry of actuation system 110.

Electrolyte control 182 may define values for electrolyte parameters of a pECM process including, but not limited to, flow rate of electrolyte 168 through interelectrode gap 138, temperature of electrolyte 168, and other electrolyte parameters associated with conditions of electrolyte 168 in interelectrode gap 130. Electrolyte control 182 may cause vacuum system 142 to pull vacuum, resulting in electrolyte 168 being pulled out interelectrode gap 138 through tool body 116 and at least one electrolyte outlet 140. Processing circuitry 176 may generate and send control signals that include the electrolyte parameters to electrolyte control circuitry of electrolyte system 104.

Figure 1E:
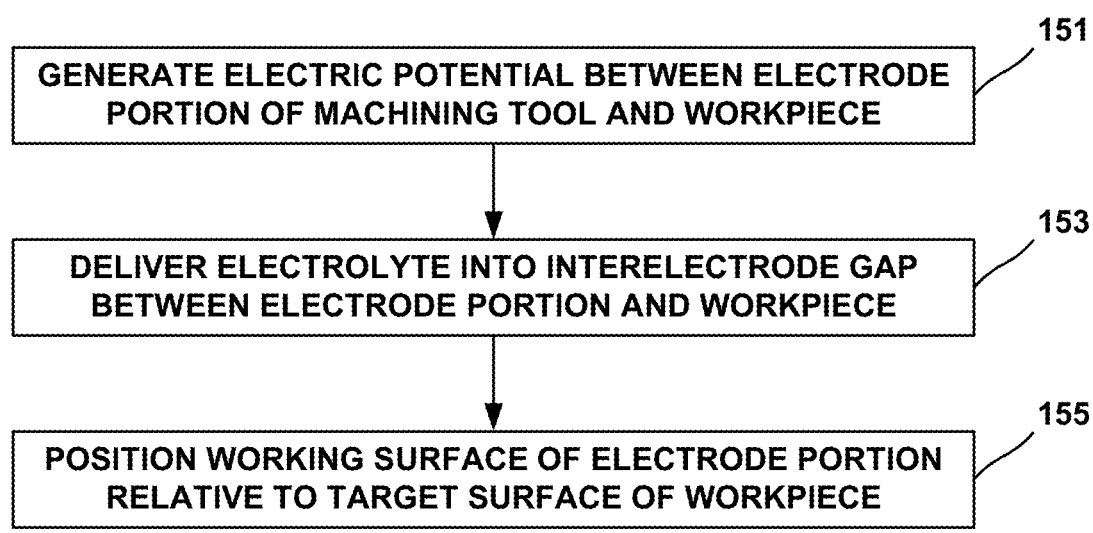
FIG. 1E is a flow diagram illustrating an example technique for controlling the pECM system of FIG. 1A.

FIG. 1E is a flow diagram illustrating an example technique for controlling pECM system 100 of FIG. 1A. While illustrated sequentially, the various steps of FIG. 1E may be initiated in a different order (or sequentially) to remove material from workpiece 120. Control system 108 may cause power supply 106 to generate an electric potential between electrode 126 and workpiece 120 (151) and cause electrolyte system 104 to deliver electrolyte 168 through channel 162A and out of aperture 152A into interelectrode gap 138 between working surface 132 of electrode 126 and target surface 134 of workpiece 120 (153) to form an electrolytic cell. Control system 108 may cause actuation system 110 to position working surface 132 of electrode 126 relative to target surface 134 of workpiece 120 (155) to control the size of interelectrode gap 138 and advance working surface 132 toward target surface 134 as material is removed from workpiece 120. In some examples, interelectrode gap 138 may be on the order of about 10 microns although other values are contemplated.

Figure 2A:
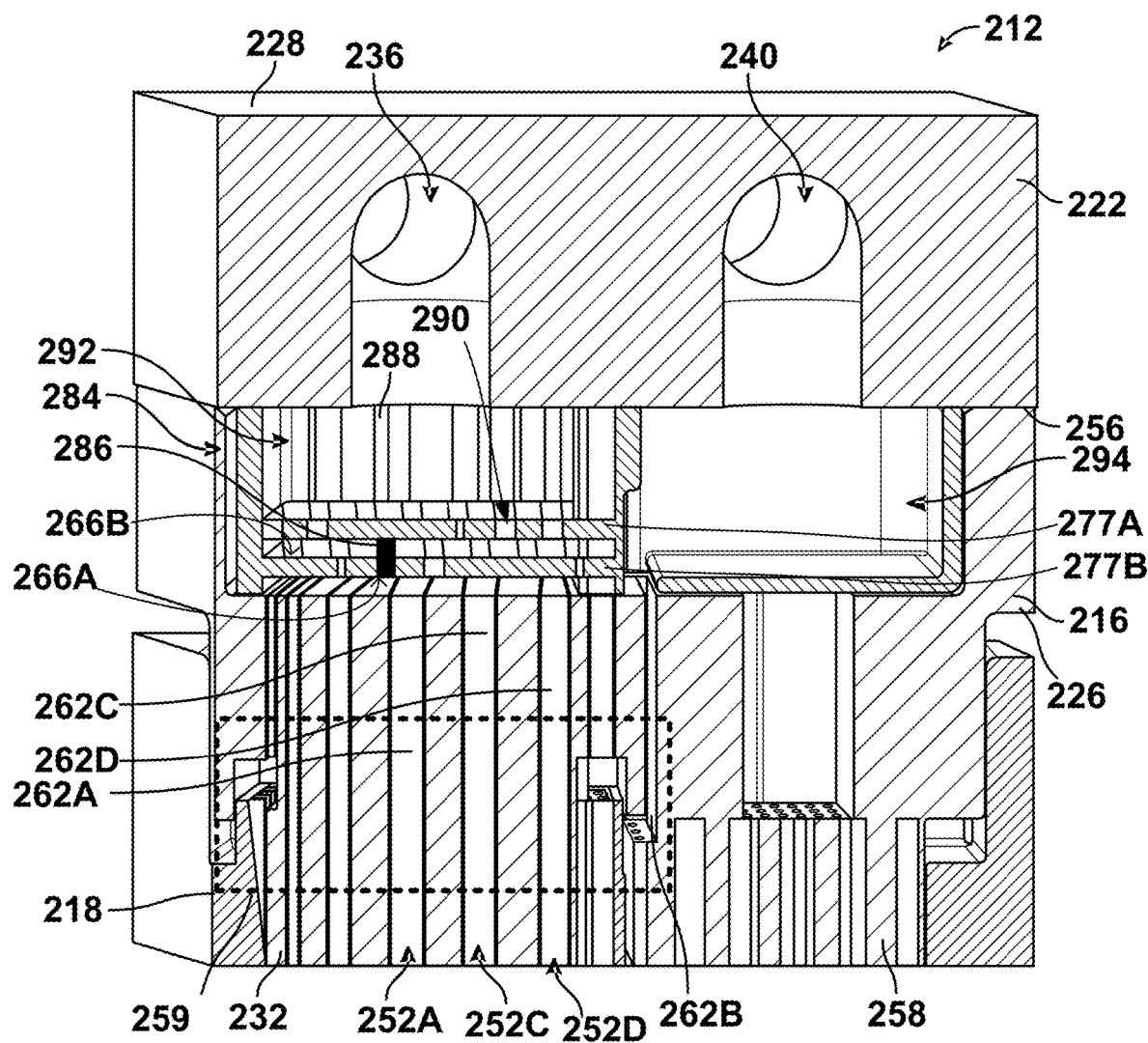
FIG. 2A is a perspective cross-sectional view diagram illustrating a portion of an example pECM system according to the present disclosure according to the present disclosure.
Figure 2B:
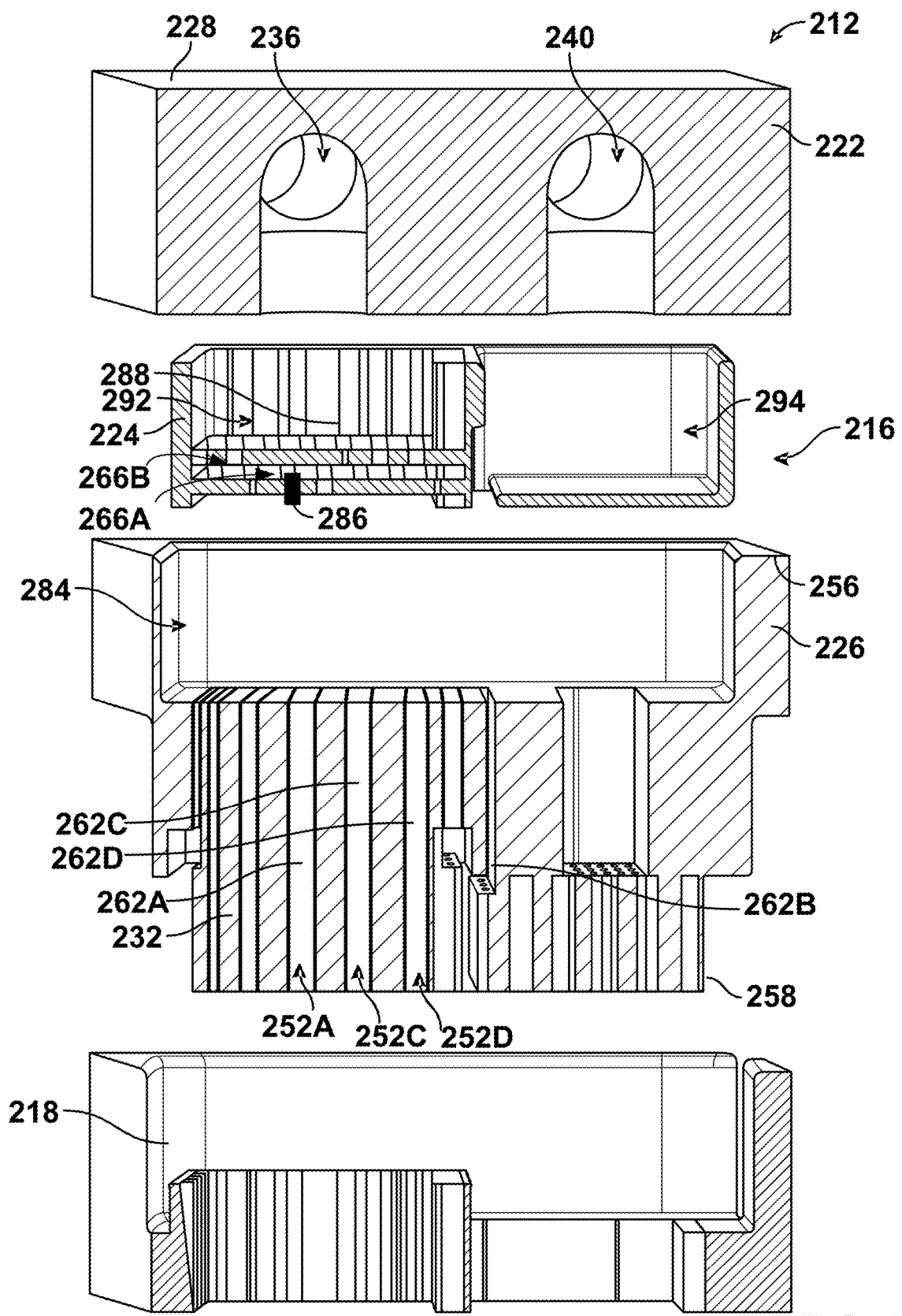
FIG. 2B is an exploded view diagram illustrating the example machining tool of FIG. 2A.
Figure 2C:
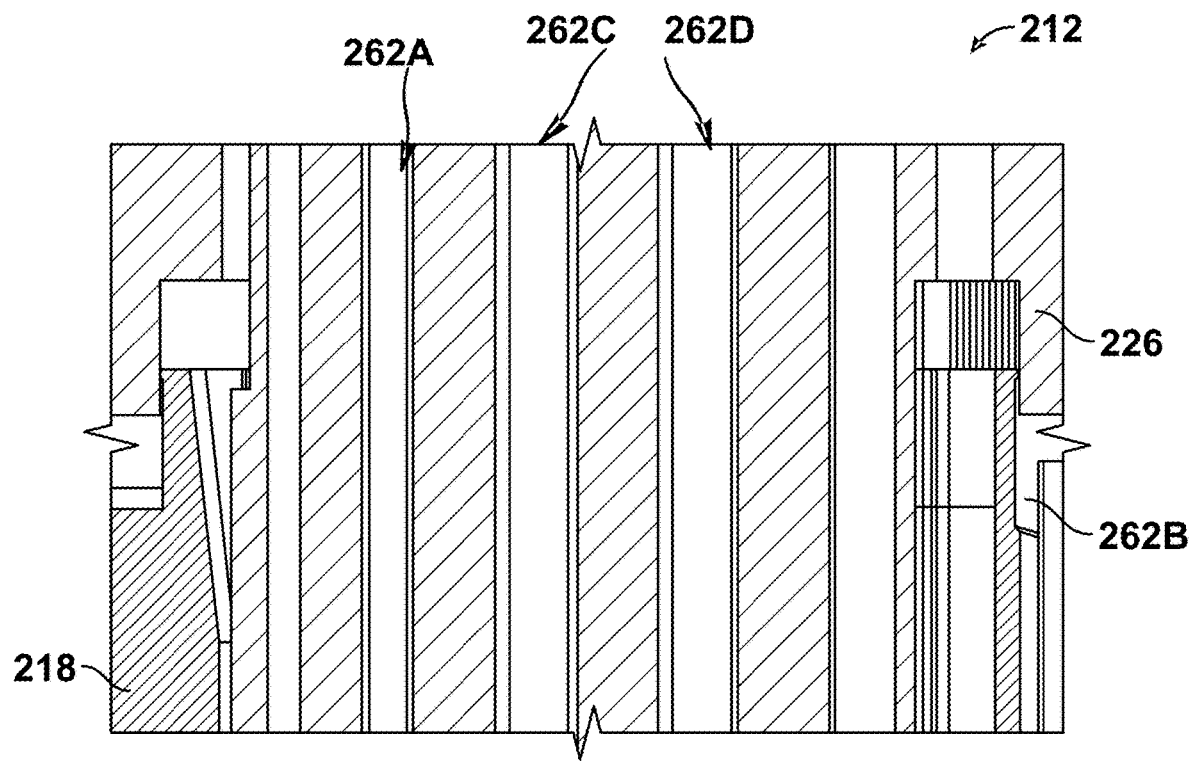
FIG. 2C is a cross-sectional side view diagram illustrating a portion of an example electrode according to the present disclosure.

FIGS. 2A-2C illustrate an example pECM tool 212. FIG. 2A is a perspective cross-sectional view illustrating example tool body 216 and flow block 218 taken along a tool axis (axis L in FIG. 1A). FIG. 2B is an exploded view illustrating the example tool body 216 of FIG. 2A and flow block 218. FIG. 2C is a side view cross-sectional conceptual diagram showing a magnified view within window 259 indicated in FIG. 2B to illustrate a closeup of channels 262 within electrode 226. Machining assembly 212 is suitable for use in pECM system 100, and may be an example of pECM machining assembly 112 of FIGS. 1A-1E. Similar elements are numbered similarly. Except where differing as described below, machining assembly 112 may generally be described as machining assembly 112 as described above with respect to FIGS. 1A-1D.

Referring to FIG. 2A, machining assembly 212 includes tool body 216, which includes manifold block 222, baffle element 224, and electrode 226. Tool body 216 is configured to receive electrolyte (such as electrolyte 168 in FIG. 1C) from the electrolyte system (such as system 104 in FIG. 1A) at the at least one electrolyte inlet 236 in manifold block 222 and feed electrolyte through baffle element 224 to working surface 232 of electrode 226.

Manifold block 222 is configured to provide at least one electrolyte inlet 236 and at least one electrolyte outlet 240. In some examples, manifold block 222 may be configured to fluidically couple to and, in some cases, mechanically support, a plurality of interchangeable versions of baffle element 224, which may have different define different electrolyte flow paths in channels 262A-D (collectively, "channels 262") in electrode 226.

Tool body 216 includes baffle element 224. Baffle element 224 may be one version of a number of different versions of baffle element 224, which may be interchangeable components dropped into tool body 216 to distribute electrolyte (such as electrolyte 168 in FIG. 1C) differently into channels 262 in electrode 226 which may be used for different machining needs and different workpiece requirements to distribute electrolyte differently into at least one channel 262A of plurality of channels 262 in electrode 226. In some examples, tool 212 may include at least one channel cover or channel plug (such as plug 286 in FIG. 2A), which may be inserted into or cover baffle element aperture 266A of baffle element apertures 266A-B (collectively, "baffle element apertures 266") in baffle element 224 or slide between baffle element 224 and electrode 226 to prevent or reduce flow of electrolyte through at least one channel 262A of electrode 226. Plug 286 may modify the flow of electrolyte through baffle element 224 compared to flow without plug 286 preventing or reducing the flow through the plugged baffle element aperture 266A. In some examples, a single plug member may be used to cover more than one aperture rather than a single aperture. In some examples, plug 286 may be configured to prevent or reduce flow through one or more of channels 262 in electrode 226 additionally or alternatively to plugging baffle element apertures 266.

In some examples, electrode 226 may define a recess 284 configured to receive baffle element 224. Accordingly, baffle element way be disposed between manifold element 222 and electrode 226 and mechanically support baffle element 224. In some examples, electrode 226 and manifold block 222 may form a seal (e.g., a fluid tight seal) around at least a portion of baffle element 224. In some examples, machining assembly 212 further includes flow block 218, and baffle element 224 and electrode 226 may be disposed between manifold block 222 and flow block 218, as illustrated. In some examples, a workpiece such as workpiece 120 of FIG. 1A-1C may be configured to be disposed between flow block 218 and electrode 226.

In some examples, baffle element 224 may define a reservoir 288. Reservoir 288 may be configured to receive electrolyte from at least one electrolyte inlet 236 and at least partially equalize pressure of electrolyte above plurality of baffle element apertures 266, such that electrolyte may enter plurality of channels 252 in electrode 226 more uniformly than resulting in uniform machining of the workpiece. In some examples, baffle element 224 defines an inlet portion 292 and an outlet portion 294. One or both of inlet portion 292 and/or outlet portion 294 may be fluidically coupled to one or more channels of plurality of channels 252 through electrode 262. In some examples, as illustrated, a plurality of baffle apertures 266 are defined inlet portion 292 and configured to distribute electrolyte into more than one of the plurality of channels 252 in electrode 226.

In some examples, baffle element 224 may define one or more levels, such as first baffle element level 277A and second baffle element level 277B. Baffle element apertures 266 may pass through first baffle element level 277A and 277B. In some examples, baffle element apertures 266 may be disposed at different locations on first baffle element level 277A and second baffle element level 277B such that electrolyte may not flow in a straight line through first baffle element 277A and second baffle element level 277B. In this way, baffle element 224 defining first baffle element level 277A and second baffle element level 277B may function to substantially equalize the electrolyte pressure over channels 262 in electrolyte 226, which in some examples may advantageously result in more uniform pECM processing of a workpiece.

Electrode 226 may be configured to mechanically couple to mechanically couple to flow block 218. In some examples, tool body 216 may be configured to receive a workpiece such as workpiece 120 of FIG. 1A. In some examples, electrode 226 and flow block 218 may be configured to form a seal around at least a portion of the perimeter of the interelectrode gap (such as gap 138 in FIG. 1B). In some examples, electrode 226 defines at least one channel 262B of plurality of channels 262 may be fluidically coupled to electrolyte outlet 240 in manifold block 222, which may be configured to fluidically couple to a vacuum system (142, FIG. 1A).

Figure 3:
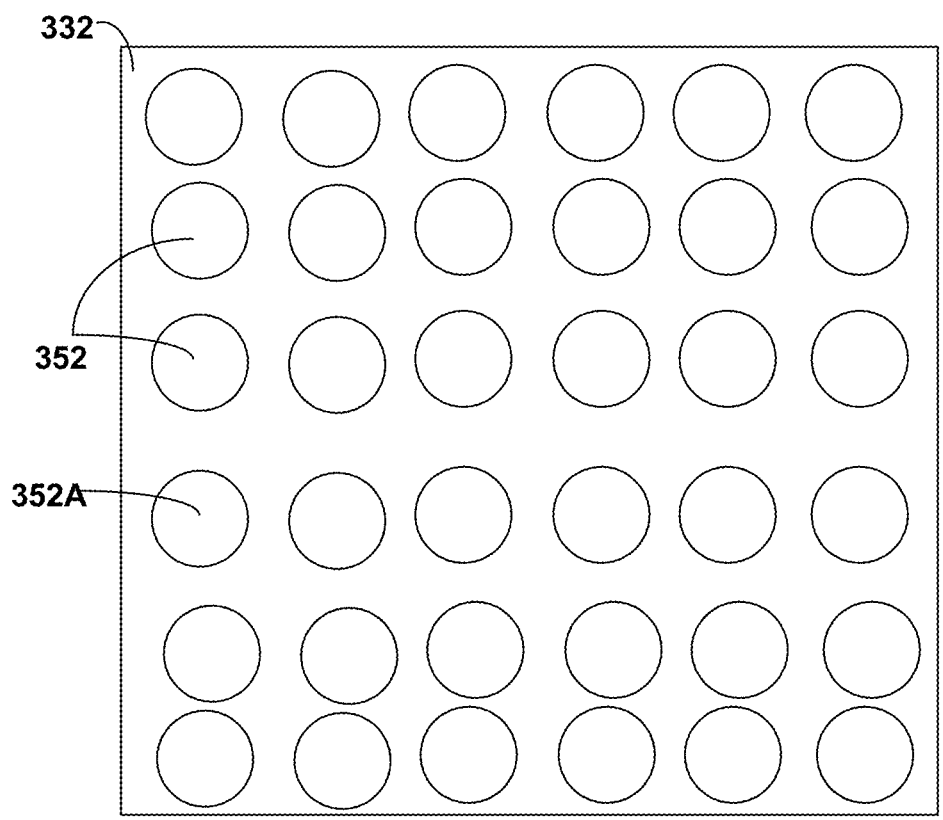
FIG. 3 is a bottom view diagram illustrating an example working surface of an electrode of a pECM tool according to the present disclosure.
Figure 4:
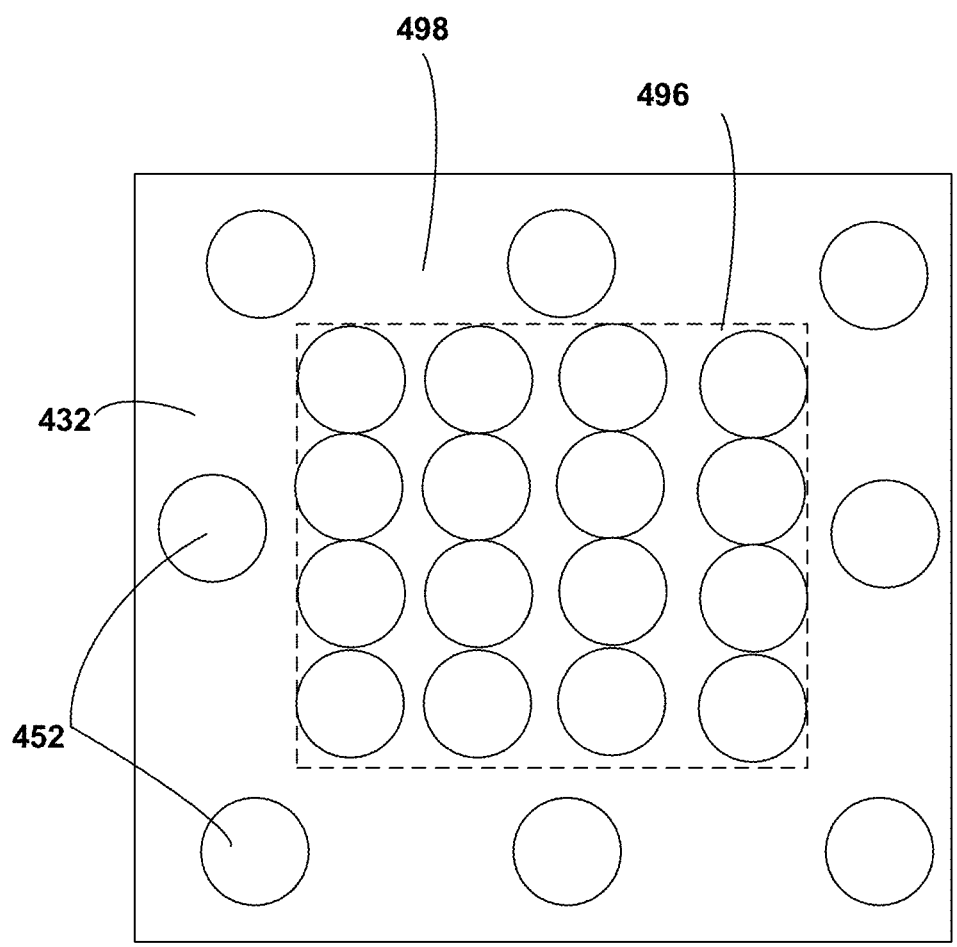
FIG. 4 is a bottom view diagram illustrating an example working surface of an electrode of a pECM tool according to the present disclosure.
Figure 5:
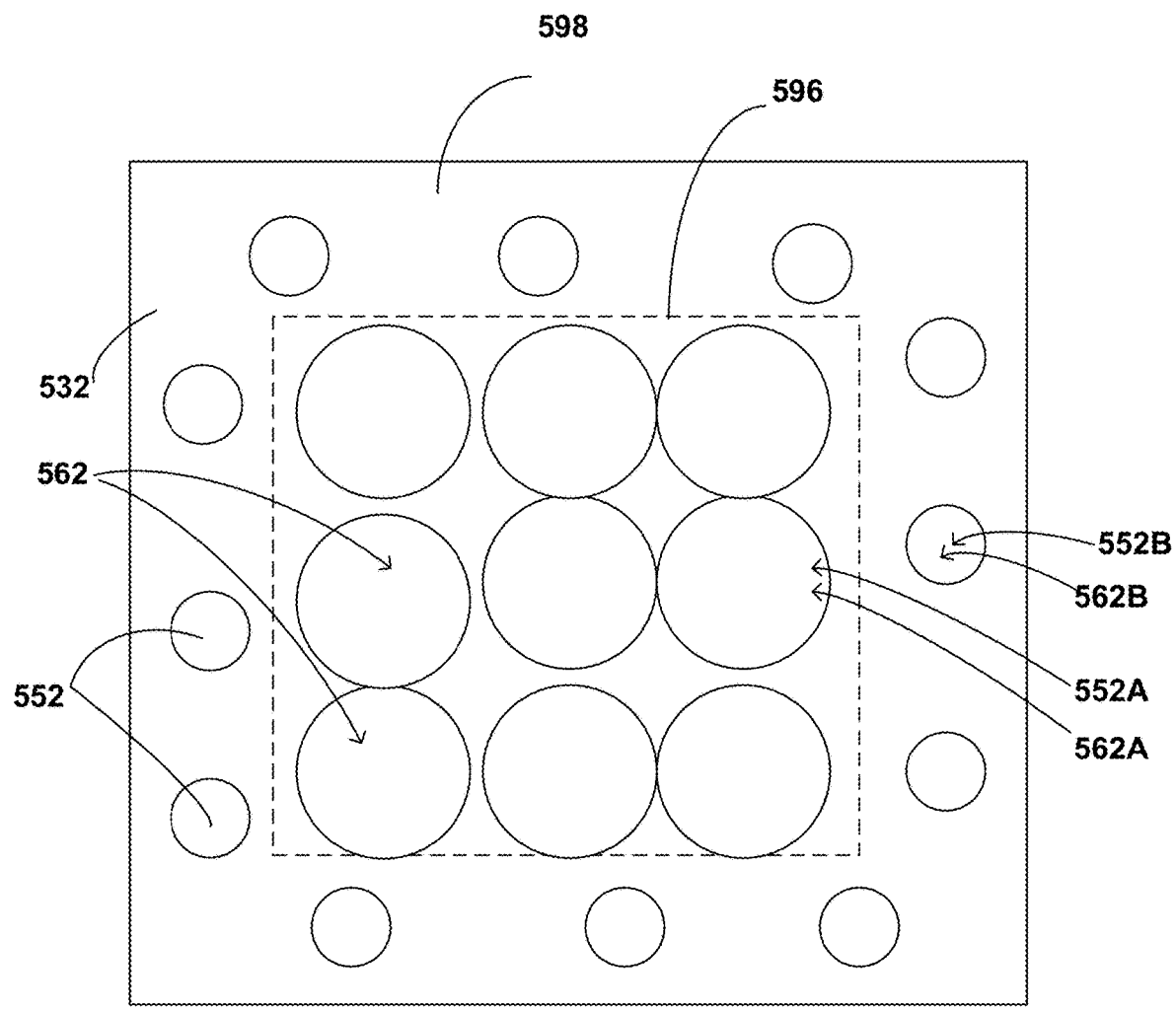
FIG. 5 is a bottom view diagram illustrating an example working surface of an electrode of a pECM tool according to the present disclosure.

FIGS. 3-5 illustrate various example working surfaces 332, 432, and 532 from a "bottom" view along axis L in FIG. 1A. Each working surface 332, 432, and 532 may be an example of working surface 132 of tool body 116 of pECM system 100 of FIGS. 1A-1D and/or working surface 232 of FIG. 2A. FIGS. 3-5 illustrate different ways that the electrode (such as electrode 126 in FIGS. 1A-1C) may define the plurality of apertures (such as plurality of apertures 152 in FIGS. 1A-1C) in the working surface (such as working surface 132 in FIGS. 1A-1C) by varying the size and/or distribution of the plurality of apertures to remove material from the target surface (such as target surface 134 in FIGS. 1A-1C) as desired.

As illustrated in FIG. 3, in some examples, plurality of apertures 352 defined by working surface 332 may be similarly sized to each other. Additionally, as illustrated, plurality of apertures 352 may be substantially evenly distributed (e.g., evenly distributed or nearly evenly distributed) across working surface 332 such that the aperture area per unit total area is substantially equal throughout working surface 332. In some examples, even distribution of plurality of apertures 352 and/or similar size for each respective aperture of plurality of apertures 352 may provide for even distribution of electrolyte (such as electrolyte 168 in FIG. 1C) into the interelectrode gap (such as interelectrode gap 138 in FIGS. 1A-1C).

Referring to FIG. 4, in some examples, as mentioned above, electrolyte (such as electrolyte 168 in FIG. 1C) delivered to the perimeter or edge areas of working surface 452 may tend to evacuate the interelectrode gap (such as interelectrode gap 138 in FIGS. 1A-1C) more quickly than electrolyte (such as electrolyte 168 in FIG. 1C) delivered to a central area. In some examples, the pECM assembly (112, FIG. 1A) may be configured to deliver more electrolyte to a central portion 496 of the working surface 432 than the perimeter portion 498 of working surface 432, which may improve accuracy or uniformity of the pECM process. For example, working surface 432 may define central portion 496 (illustrated by the area inside the dashed rectangle) and perimeter portion 498 (illustrated by the area outside the dashed rectangle), and surface area of central portion 496 may be approximately equal to a surface area of perimeter portion 498. In some examples, as illustrated, central portion 496 may be configured to deliver a greater volume of electrolyte (such as electrolyte 168 in FIG. 1C) to the interelectrode gap (such as interelectrode gap 138 in FIGS. 1A-1C) than perimeter portion 498 by defining more aperture area per unit total area than the perimeter portion 498. For example, the central portion 496 of the working surface 432 may be include more aperture area per unit total area by defining a larger number of similarly sized apertures 452 per unit total area relative to perimeter portion 498.

Similarly, as illustrated by FIG. 5, the central portion 596 (illustrated by the area inside the dashed rectangle) of working surface 532 may be configured to deliver a greater volume of electrolyte (such as electrolyte 168 in FIG. 1C) to interelectrode gap (such as interelectrode gap 138 in FIGS. 1A-1C) than the perimeter portion 598 (illustrated by the area inside the dashed rectangle) by defining more aperture area per unit total area than the perimeter portion 598. In some examples, more apertures area per unit total area may be defining relatively larger apertures 552A in central portion 596 and relatively smaller apertures 552B in perimeter portion 598. In some examples, each respective aperture 552A e of the plurality of apertures 552 may define a corresponding channel 562A of plurality of channels 562. Accordingly, working surface 532 may define larger channels of the plurality of channels 552 in the central portion 596 than perimeter portion 598.

In some examples, each respective channel of plurality of channels 562 may define a minimum cross-sectional area, and at least one channel 562A may open at the first end (such as first end 158 in FIG. 1B) in the central portion 596 of working surface 532 and at least one channel 562 may open at the first end (such as first end 158 in FIG. 1B) in perimeter portion 598 of working surface 532. In some examples, each channel of the plurality of channels 562 may defines minimum cross-sectional area, and at least one first channel 562A of the plurality of channels 562 may open at the first end (such as first end 158 in FIG. 1B) in central portion 596 of working surface 532 and at least one second channel 562B of plurality of channels 562 may open at first end (such as first end 158 in FIG. 1B) in the perimeter portion 598 of working surface 532. In some examples, each first channel 562A may define a larger minimum cross-sectional area than each second channel 562B opening into perimeter portion 598 of working surface 532, as illustrated.

Figure 6:
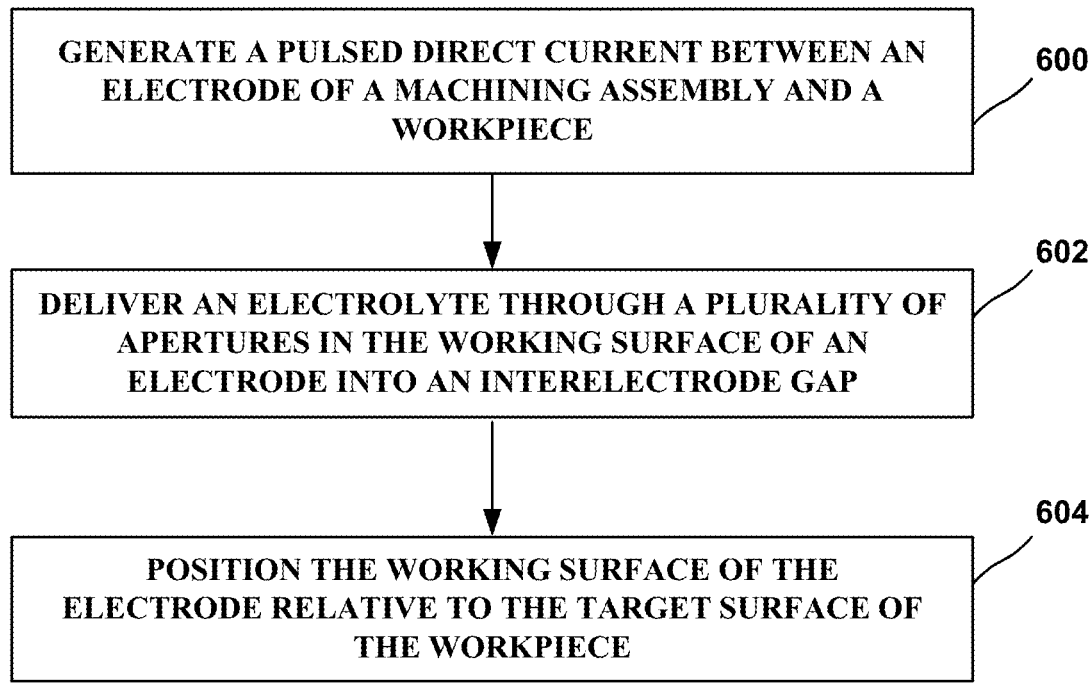
FIG. 6 is a flowchart illustrating an example technique according to the present disclosure.

FIG. 6 is a flowchart illustrating an example technique for pulsed electrochemical machining workpiece 120. Although the technique is described primarily with respect to pECM system 100 and pECM machining assembly 112 of FIGS. 1A-1D, pECM system 100 and machining assembly 112 may be used to perform other techniques, and other pECM systems and machining tools (e.g., machining assembly 212 of FIGS. 2A-2C), may be used to perform the described techniques. All or a portion of the described technique may be performed by the various components of system 100 under the control of control system 108 using control circuitry.

As shown in FIG. 6, system 100 may generate (using power supply 106) a pulsed direct current between one or more electrodes 126 of machining assembly 112 and workpiece 120 (600). Machining assembly 112 comprises tool body 116, which may oscillate or otherwise move about tool axis L. Tool body 116 includes electrode 126, and electrode 126 includes an electrically conductive material. Electrode 126 defines a working surface 132, which may face workpiece 120.

System 100 may deliver (e.g., using electrolyte system 104) electrolyte (such as electrolyte 168 in FIG. 1C) through a plurality of apertures 152 in working surface 132 into interelectrode gap 138 (602). Interelectrode gap 138 may be disposed between working surface 132 of electrode 126 and target surface 134 of workpiece 120, and plurality of apertures 152 may fluidically couple to electrolyte system 104.

System 100 may position (e.g., using actuation system 110) working surface 132 of electrode 126 relative to target surface 134 of workpiece 120 to remove material from target surface 134 of workpiece 120 (604).

In some examples, electrode 126 defines a second end 156 and first end 158. Each aperture 152A of plurality of apertures 152 may correspond to a channel 162A of plurality of channels 162 extending from working surface 132 at least partway through electrode 126 towards a second end 156 of electrode 126. In some examples, delivering electrolyte (such as electrolyte 168 in FIG. 1C) into interelectrode gap 138 may include flowing electrolyte (such as electrolyte 168 in FIG. 1C) through at least one channel 162A of plurality of channels 162.

In some examples, system 100 may deliver electrolyte (such as electrolyte 168 in FIG. 1C) into interelectrode gap 138 by flowing electrolyte (such as electrolyte 168 in FIG. 1C) through at least one channel 162A of plurality of channels 162, which may extend through electrode 126 from working surface 132 to second end 156. In some examples, at least one channel 162A of the plurality of channels 162 may fluidically couple to electrolyte inlet 136, which may be formed in manifold block 122. In some examples, at least one channel 162B of plurality of channels 162 may fluidically couple to an electrolyte outlet 140, which may be formed in manifold block 122.

In some examples, electrode 126 may include an electrically conductive material at working surface 132. In some examples, the electrically conductive material may include a metal, a metal alloy, a ceramic, or combinations thereof. In some examples, at least one of the one or more electrodes 126 may be formed through additive manufacturing. In some examples, at electrode 126 may be additively manufactured in a single, complete piece. In some examples, machining assembly 112 may deliver electrolyte (such as electrolyte 168 in FIG. 1C) into interelectrode gap 138 by distributing electrolyte (such as electrolyte 168 in FIG. 1C) across working surface 132 through plurality of apertures 152, which may be evenly distributed across working surface 132.

With concurrent reference to FIG. 1C, FIG. 4, FIG. 5, and FIG. 6, in some examples, system 100 may deliver electrolyte (such as electrolyte 168 in FIG. 1C) to interelectrode gap 138 by delivering a greater volume of electrolyte (such as electrolyte 168 in FIG. 1C) to central portion 496, 596 of working surface 432, 532 than perimeter portion 498, 598 of working surface 432, 532. In some examples, working surface 432, 532 defines central portion 498, 598 which may include approximately half of the surface area of the working surface 432, 532 and a perimeter portion 498, 598 which also may include approximately half of the surface area of the working surface 432, 532. In some examples, as illustrated by FIG. 4, system 100 may deliver a greater volume of electrolyte (such as electrolyte 168 in FIG. 1C) to central portion 496 includes delivering electrolyte (such as electrolyte 168 in FIG. 1C) to a central portion 496, 596 which may define more aperture area per unit total area that perimeter portion 498, 598. defined in central portion 496 than in perimeter portion 498.

Referring concurrently to FIGS. 1B, 1C, FIG. 5, and FIG. 6, in some examples, electrode 126 defines second end 156 and first end 158, and each respective aperture 152A of plurality of apertures 152 corresponds to a channel 162A of the plurality of channels 162 extending from second end 156 of electrode 126 at least partway to first end 158 of electrode 126. Each channel 162A of plurality of channels 162 may define a minimum cross-sectional area, and at least one of the channels 162 may open at the first end in central portion 596 of working surface 532. Similarly, at least one of the channels 162 may open at the first end 158 in perimeter portion 598 of working surface 532. In some examples, as illustrated by FIG. 5, system 100 may deliver a greater volume of electrolyte (such as electrolyte 168 in FIG. 1C) to the central portion 596 by delivering electrolyte (such as electrolyte 168 in FIG. 1C) to channels defining a larger cross-sectional area in central portion 596 than in perimeter portion 598.

Referring to FIGS. 1A, 1B, and FIG. 6, in some examples, the system 100 may further include form a seal between tool body 116 and a bottom flow block 118. In some examples, system 100 may pull a vacuum with vacuum system 142 through a channel 162B of electrode 126.

Figure 7:
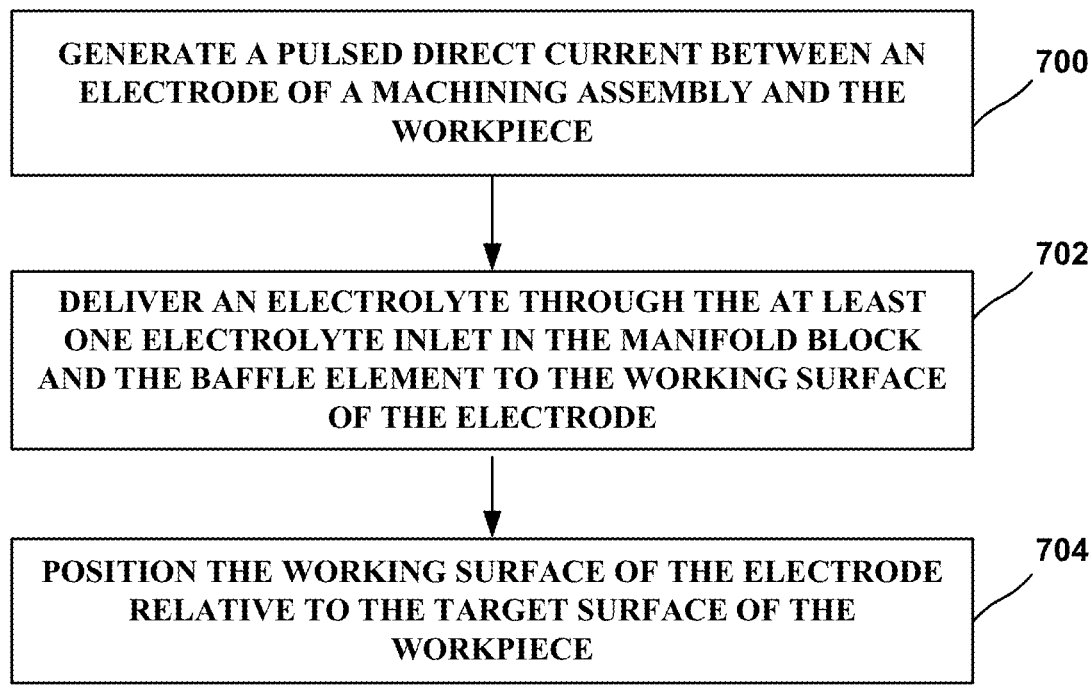
FIG. 7 is a flowchart illustrating an example technique according to the present disclosure.

FIG. 7 is a flowchart illustrating an example technique for pulsed electrochemical machining workpiece 120. Although the technique is described primarily with respect to pECM system 100 and pECM machining assembly 112 of FIGS. 1A-1D, pECM system 100 and machining assembly 112 may be used to perform other techniques, and other pECM systems and machining tools (e.g., machining assembly 212, FIGS. 2A-2C), may be used to perform the described techniques. All or a portion of the described technique may be performed by the various components of system 100 under the control of control system 108 using control circuitry.

As shown in FIG. 7, system 100 may generate (using power supply 106) a pulsed direct current between one or more electrodes 126 of machining assembly 112 and workpiece 120 (700). Machining assembly 112 includes tool body 116. Tool body 116 includes manifold block 122, and manifold block 122 defines electrolyte inlet 136 and electrolyte outlet 140. Tool body 116 also includes baffle element 124 and electrode 126. Electrode 126 includes an electrically conductive material and defines working surface 132, which may face workpiece 120.

System 100 may deliver electrolyte (such as electrolyte 168 in FIG. 1C) through electrolyte inlet 136 in manifold block 122 and baffle element 124 to working surface 132 of electrode 126 (702). In some examples, system 100 may deliver electrolyte (such as electrolyte 168 in FIG. 1C) to working surface 132 by delivering electrolyte (such as electrolyte 168 in FIG. 1C) to electrolyte inlet 136 prior to delivering electrolyte 168 to baffle element 124, and delivering electrolyte (such as electrolyte 168 in FIG. 1C) to baffle element 124 prior to delivering electrolyte (such as electrolyte 168 in FIG. 1C) to working surface 132. In some examples, baffle element 124 may split a stream of electrolyte (such as electrolyte 168 in FIG. 1C) and distribute electrolyte (such as electrolyte 168 in FIG. 1C) into at least one channel 162A of plurality of channels 162 in electrode 126.

System 100 may position working surface 132 of electrode 126 relative to target surface 134 of workpiece 120 to remove material from target surface 134 of workpiece 120 (704). In some examples, system 100 may mechanically support electrode 126 with flow block 118.

In some examples, system 100 may form a seal around at least a portion of baffle element 124 by mechanically coupling electrode 126 to manifold block 124. In some examples, system 100 may prevent or reduce flow of electrolyte (such as electrolyte 168 in FIG. 1C) through at least one channel 162A of plurality of channels 162. In some examples, flow of electrolyte 168 may be prevented or reduced using a channel cover or channel plug (such as plug 286 in FIG. 2A). In some examples, machining assembly 112 may position baffle element 124 in a recess (284, FIGS. 2A-2B) defined by electrode 126.

In some examples, system 100 may also deliver electrolyte (such as electrolyte 168 in FIG. 1C) to electrolyte outlet 140, which may be formed in baffle element 122, from working surface 132 through electrode 126 and baffle element 124. In this way, electrolyte system 104 may circulate electrolyte 168 from electrolyte storage tank 146 to interelectrode gap 138 through machining assembly 112.

In some examples, system 100 may also distribute electrolyte (such as electrolyte 168 in FIG. 1C) into more than one of the plurality of channels 162 in electrode 126, and baffle element 124 may define inlet portion (292, FIGS.

2A-2B) and outlet portion (294, FIGS. 2A-2B). Inlet portion (292, FIGS. 2A-2B) may define a plurality of baffle element apertures (266, FIGS. 2A-2B) which may be configured to distribute electrolyte (such as electrolyte 168 in FIG. 1C) into plurality of channels 162 in electrode 126. In some examples, baffle element 124 may define more outlet apertures than inlet apertures.

Figure 8:
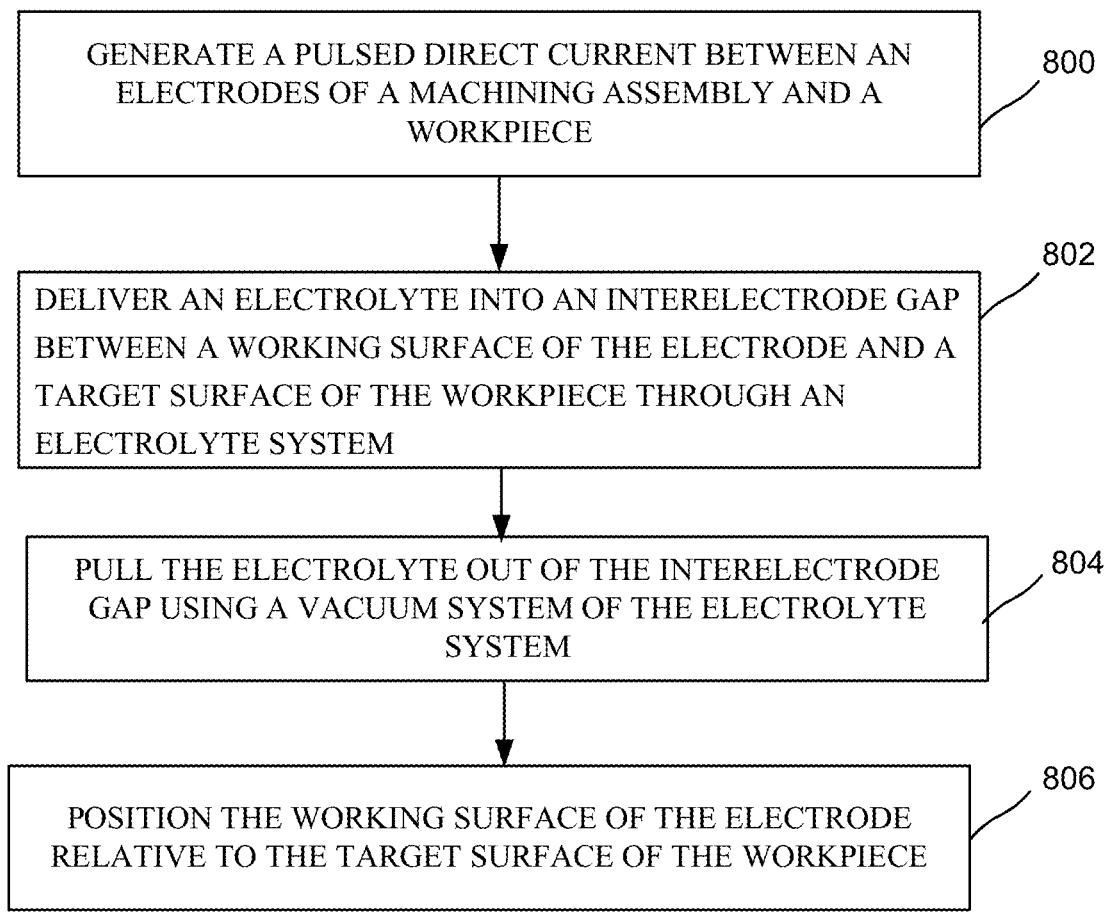
FIG. 8 is a flowchart illustrating an example technique according to the present disclosure.

FIG. 8 is a flowchart illustrating an example technique for pulsed electrochemical machining workpiece 120. Although the technique is described primarily with respect to pECM system 100 and pECM machining assembly 112 of FIGS. 1A-1D, pECM system 100 and machining assembly 112 may be used to perform other techniques, and other pECM systems may be used to perform the described techniques. All or a portion of the described technique may be performed by the various components of system 100 under the control of control system 108 using control circuitry.

System 100 may generate a pulsed direct current between electrode 126 of machining assembly 112 and workpiece 120 (800). Machining assembly 112 includes tool body 116, and tool body 116 may define tool axis L. Tool body 116 includes electrode 126, and electrode 126 includes an electrically conductive material and defines working surface 132 at a first end of tool axis L. Working surface 132 may face target surface 134 of workpiece 120.

System 100 may deliver electrolyte (such as electrolyte 168 in FIG. 1C) into interelectrode gap 138 between working surface 132 of electrode 126 and target surface 134 of workpiece 120 through electrolyte system 104 (802).

System 100 may also pull electrolyte (such as electrolyte 168 in FIG. 1C) out of interelectrode gap 138 using vacuum system 142, which may be a component or subsystem of electrolyte system 104 (804). In some examples, system 100 may pull electrolyte (such as electrolyte 168 in FIG. 1C) out of interelectrode gap 138 by flowing electrolyte (such as electrolyte 168 in FIG. 1C) through a channel 162B defined by electrode 126. In some examples, channel 162B, which may fluidically couple to vacuum system 142, overlaps tool axis L. In some examples, vacuum system 142 may include a vacuum pump, which may pull vacuum at relatively high vacuum pressure, such that the vacuum pump, in some examples, may operate at vacuum levels of at least 12 in. Hg, such as about 18 in. Hg, or about 22 in. Hg. In some examples, vacuum system 142 may additionally or alternatively include one or more eductors which may pull electrolyte (168, FIG. 1C) out of interelectrode gap 138.

System 100 may also position working surface 132 of electrode 126 relative to target surface 134 of workpiece 120 to remove material from target surface 134 of workpiece 120 (806).

In some examples, electrolyte system 104 may circulate electrolyte (such as electrolyte 168 in FIG. 1C) through machining assembly 112. In some examples, electrolyte system 104 may include electrolyte storage tank 146. In some examples, vacuum system 142 include a vacuum pump that may be disposed between electrolyte outlet 140 of pECM machining assembly 112 and electrolyte storage tank 146. In some examples, electrolyte system 104 may further include second pump 144 disposed between electrolyte storage tank 146 and electrolyte inlet 136 of pECM machining assembly 112, and pump 144 may push electrolyte (such as electrolyte 168 in FIG. 1C) through machining assembly 112 in addition or in the alternative to vacuum system 142 pulling electrolyte through machining assembly 112.

In some examples, working surface 132 of electrode 126 defines protrusion 127 configured to define recess 129 in target surface 134 of workpiece 120 after machining of workpiece 120. In some examples, protrusion 127 defines a depth dimension and a length dimension, and the length dimension has greater magnitude than the depth dimension. Vacuum system 142 may pull electrolyte out of recess 129 of workpiece 120.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following clauses and claims.

Clause 1: A pulsed electrochemical machining (pECM) assembly includes a tool body defining a tool axis, the tool body comprising an electrode, the electrode comprising an electrically conductive material and defining a working surface configured to face a workpiece, and wherein the working surface defines a plurality of apertures configured to fluidically couple to an electrolyte system.

Clause 2: The pECM machining assembly of clause 1, wherein the electrode defines a first end defining the working surface and a second end, and each aperture of the plurality of apertures corresponds to a channel of a plurality of channels extending through the electrode from the working surface at least part of the way to the second end.

Clause 3: The pECM machining assembly of clause 2, wherein at least one channel of the plurality of channels extends through the electrode from the working surface to the second end.

Clause 4: The pECM machining assembly of clause 2 or 3, wherein at least one channel of the plurality of channels is fluidically coupled to an electrolyte inlet.

Clause 5: The pECM machining assembly of any of clauses 2-4, wherein at least one channel of the plurality of channels is fluidically coupled to an electrolyte outlet.

Clause 6: The pECM machining assembly of any of clauses 1-5, wherein the electrode comprises a metal.

Clause 7: The pECM machining assembly of any of clauses 1-6, wherein the electrode is formed through additive manufacturing.

Clause 8: The pECM machining assembly of any of clauses 1-7, wherein the electrode is additively manufactured in a single, complete piece.

Clause 9: The pECM machining assembly of any of clauses 1-8, wherein the plurality of apertures are evenly distributed across the working surface.

Clause 10: The pECM machining assembly of any of clauses 1-9, wherein the working surface comprises a central portion of the working surface and a perimeter portion of the working surface, wherein a surface area of the central portion is approximately equal to a surface area of the perimeter portion, and wherein the central portion is configured to deliver a greater volume of electrolyte to the interelectrode gap than the perimeter portion.

Clause 11: The pECM machining assembly of clause 10, wherein the central portion defines more aperture area per unit total area than the perimeter portion.

Clause 12: The pECM machining assembly of clause 10 or 11, wherein the electrode defines a first end and a second end, and each aperture of the plurality of apertures corresponds to a channel of a plurality of channels extending from the first end of the electrode to the second end of the electrode, wherein each channel of the plurality of channels defines a minimum cross-sectional area, and wherein at least one first channel of the plurality of channels opens at the first end in the central portion of the working surface and at least one second channel of the plurality of channels open at the first end in the perimeter portion of the working surface, and wherein each first channel of the at least one first channel opening into the central portion of the working surface defines a larger minimum cross-sectional area than each second channel of the at least one second channel opening into the perimeter portion of the working surface.

Clause 13: The pECM machining assembly of any of clauses 1-12, wherein the tool body is configured to form a seal around at least a portion of a perimeter of the interelectrode gap when coupled a flow block.

Clause 14: The pECM machining assembly of any of clauses 1-13, wherein the electrode defines a channel configured to be fluidically coupled to a vacuum pump.

Clause 15: The pECM machining assembly of any of clauses 1-14, further comprising a baffle element fluidically coupled to the electrode.

Clause 16: The pECM machining assembly of any of clauses 1-15, further comprising a manifold block fluidically coupled to the electrode.

Clause 17: The pECM machining assembly of any of clauses 1-16, further comprising the flow block mechanically coupled to the electrode.

Clause 18: A pECM system comprising the pECM machining assembly of any of clauses 1-17.

Clause 19: The pECM system of clause 18, the pECM system further comprising a vacuum system configured to pull electrolyte out of the interelectrode gap.

Clause 20: A method for pulsed electrochemical machining (pECM) a workpiece includes generating a pulsed direct current between an electrode of a tool body of a pECM machining assembly and the workpiece, the tool body defining a tool axis, and the electrode comprising an electrically conductive material and defining a working surface at a first end configured to face the workpiece, delivering an electrolyte through a plurality of apertures in the working surface into an interelectrode gap between the working surface of electrode and a target surface of the workpiece, wherein the plurality of apertures are configured to fluidically couple to an electrolyte system; and positioning the working surface of the electrode relative to the target surface of the workpiece to remove material from the target surface of the workpiece.

Clause 21: The method of clause 20, wherein the electrode defines the first end defining the working surface and a second end, each aperture of the plurality of apertures corresponds to a channel of a plurality of channels extending from the working surface at least partway through the electrode towards the second end of the electrode, and delivering electrolyte into the interelectrode gap includes flowing electrolyte through at least one channel of the plurality of channels.

Clause 22: The method of clause 21, wherein delivering electrolyte into the interelectrode gap includes feeding electrolyte through at least one channel of the plurality of channels, wherein the at least one channel extends through the electrode from the working surface to the second end.

Clause 23: The method of clause 20 or 21, wherein at least one channel of the plurality of channels is fluidically coupled to an electrolyte inlet.

Clause 24: The method of any of clauses 20-23, wherein at least one channel of the plurality of channels is fluidically coupled to an electrolyte outlet.

Clause 25: The method of any of clauses 20-24, wherein the electrode comprises a metal.

Clause 26: The method of any of clauses 20-25, wherein the electrode is formed through additive manufacturing.

Clause 27: The method of any of clauses 20-26, wherein the electrode is additively manufactured in a single, complete piece.

Clause 28: The method of any of clauses 20-27, wherein delivering electrolyte into the interelectrode gap comprises distributing electrolyte across the working surface through the plurality of apertures, wherein the plurality of apertures are evenly distributed across the workpiece.

Clause 29: The method of any of clauses 20-28, wherein delivering electrolyte comprises delivering a greater volume of electrolyte to a central portion of the working surface than a perimeter portion of the working surface, wherein a surface area of the central portion is approximately equal to a surface area of the perimeter portion.

Clause 30: The method of clause 29, wherein the central portion defines a larger aperture area per unit area than the perimeter portion.

Clause 31: The method of clause 29 or 30, wherein the electrode defines the first end and a second end, and each aperture of the plurality of apertures corresponds to a channel extending from the first end of the electrode to the second end of the electrode, wherein each channel of the plurality of channels defines a minimum cross-sectional area, and wherein at least one first channel of the plurality of channels opens at the first end in the central portion of the working surface and at least one second channel of the plurality of channels open at the first end in the perimeter portion of the working surface, and wherein each first channel of the at least one first channel opening into the central portion of the working surface defines a larger minimum cross-sectional area than each second channel of the at least one second channel opening into the perimeter portion of the working surface.

Clause 32: The method of any of clauses 20-31, further comprising forming a seal between the tool body and a flow block.

Clause 33: The method of any of clauses 20-32, further comprising pulling a vacuum through a channel in at least one of the one or more electrodes.

Clause 34: The method of any of clauses 20-33, wherein delivering the electrolyte to the working surface comprises flowing the electrolyte through a baffle element fluidically coupled to the electrode.

Clause 35: The method of any of clauses 20-34, wherein delivering the electrolyte to the working surface comprises flowing the electrolyte through a manifold block mechanically coupled to the electrode.

Clause 36: A pulsed electrochemical machining (pECM) assembly includes a tool body, the tool body includes a manifold block defining at least one electrolyte inlet and at least one electrolyte outlet; a baffle element; and an electrode, the electrode comprising an electrically conductive material and defining a working surface configured to face a workpiece, wherein the tool body is configured to receive electrolyte from an electrolyte system at the at least one electrolyte inlet in the manifold block and feed electrolyte through the baffle element to the working surface of the electrode.

Clause 37: The pECM machining assembly of clause 36, wherein the baffle element is configured to be disposed between the manifold block and at the electrode.

Clause 38: The pECM machining assembly of clause 36 or 37, wherein the baffle element is configured to distribute electrolyte into at least one channel of a plurality of channels in the electrode.

Clause 39: The pECM machining assembly of clause 3, further comprising at least one channel plug configured to prevent or reduce flow of electrolyte through at least one channel of the plurality of channels.

Clause 40: The pECM machining assembly of any of clauses 36-39, wherein the electrode defines a recess configured to receive the baffle element.

Clause 41: The pECM machining assembly of any of clauses 36-40, wherein the electrolyte system is configured to flow electrolyte through the tool body from the working surface to the at least one electrolyte outlet of the manifold block.

Clause 42: The pECM machining assembly of any of clauses 36-41, further comprising a flow block, wherein the baffle element and the electrode are configured to be disposed between the manifold block and the flow block.

Clause 43: The pECM machining assembly of any of clauses 36-42, wherein the tool body is configured to fluidically couple the working surface of the electrode to the at least one electrolyte outlet of the manifold block.

Clause 44: The pECM machining assembly of any of clauses 36-43, wherein the electrode and the manifold block are configured to form a seal around at least a portion of the baffle element.

Clause 45: The pECM machining assembly of any of clauses 36-44, wherein the baffle element comprises a plastic.

Clause 46: The pECM machining assembly of clause 38, wherein the baffle element defines an inlet portion and an outlet portion, and wherein the inlet portion defines a plurality of apertures configured to distribute electrolyte into more than one of the plurality of channels in at the electrode.

Clause 47: The pECM machining assembly of any of clauses 36-46, wherein the baffle element is formed in one piece through additive manufacturing.

Clause 48: The pECM machining assembly of any of clauses 36-47, further comprising the electrolyte system.

Clause 49: The pECM machining assembly of clause 48, wherein the electrolyte system comprises a vacuum system comprising a vacuum pump.

Clause 51: A method for pulsed electrochemical machining (pECM) a workpiece includes generating a pulsed direct current between an electrode of a pECM machining assembly and the workpiece, wherein the machining assembly comprises a tool body, the tool body comprising a manifold block defining at least one electrolyte inlet and at least one electrolyte outlet, a baffle element, and an electrode, the electrode comprising an electrically conductive material and defining a working surface configured to face a workpiece, delivering an electrolyte through the at least one electrolyte inlet in the manifold block and the baffle element to the working surface of the electrode; and positioning the working surface of the electrode relative to the target surface of the workpiece to remove material from the target surface of the workpiece.

Clause 52: The method of clause 51, wherein delivering the electrolyte to the working surface comprises delivering electrolyte to the at least one electrolyte inlet of the manifold block prior to delivering electrolyte to the baffle element, and delivering electrolyte to the baffle element prior to delivering electrolyte to the working surface.

Clause 53: The method of clause 51 or 52, further comprising splitting a stream of electrolyte at the baffle element and distributing electrolyte into at least one of a plurality of channels in the electrode.

Clause 54: The method of clause 53, further comprising preventing or reducing flow through at least one channel of the plurality of channels in the electrode.

Clause 55: The method of any of clauses 51-54, further comprising positioning the baffle element in a recess defined by the electrode.

Clause 56: The method of any of clauses 51-55, further comprising delivering electrolyte to the at least one electrolyte outlet in the manifold block from the working surface of the electrode.

Clause 57: The method of any of clauses 51-56, further comprising a mechanically supporting the electrode with a flow block.

Clause 58: The method of any of clauses 51-57, further comprising forming a seal around at least a portion of the baffle element by mechanically coupling the electrode and the manifold block.

Clause 59: The method of any of clauses 51-58, wherein the baffle element comprises a plastic.

Clause 60: The method of clause 53, further comprising distributing electrolyte into more than one of a plurality of channels in the electrode, wherein the baffle element defines an inlet portion and an outlet portion, and wherein the inlet portion defines a plurality of apertures configured to distribute electrolyte into the plurality of channels in at least one of the electrodes.

Clause 61: The method of any of clauses 51-60, wherein the baffle element is formed in one piece through additive manufacturing.

Clause 62: The method of any of clauses 51-61, wherein delivering electrolyte to the working surface further comprises flowing electrolyte through an electrolyte system.

Clause 63: The method of clause 62, wherein delivering electrolyte to the at least one electrolyte outlet further comprises pulling electrolyte out of an interelectrode gap with a vacuum system.

Clause 64: A pulsed electrochemical machining (pECM) system includes a pECM machining assembly comprising a tool body, the tool body comprising an electrode, the electrode comprising an electrically conductive material and defining a working surface configured to face a workpiece; a mechanical system configured to position the working surface of the one or more electrodes relative to the workpiece; an electrolyte system configured to supply electrolyte to an interelectrode gap between the working surface of the electrode and a target surface of the workpiece, wherein the electrolyte system comprises a vacuum system configured to pull electrolyte from the interelectrode gap through the electrode; and a power supply configured to generate a pulsed direct current between the one or more electrodes of the pECM tool and the workpiece.

Clause 65: The pECM system of clause 64, wherein the electrolyte system further comprises an electrolyte storage tank, and wherein the vacuum system comprises a vacuum pump disposed between an outlet of the pECM machining tool and the electrolyte storage tank.

Clause 66: The pECM system of clause 65, wherein the electrolyte system further comprises a second pump configured to push electrolyte through the electrode into the interelectrode gap, wherein the second pump is disposed between the electrolyte storage tank and an inlet of the pECM machining tool.

Clause 67: The pECM system of any of clauses 64-66, wherein the electrode comprises at least one channel fluidically coupled to the vacuum system.

Clause 68: The pECM system of clause 67, wherein the at least one channel fluidically coupled to the vacuum system overlaps the tool axis.

Clause 69: The pECM system of any of clauses 64-68, wherein the vacuum system comprises a vacuum pump configured to pull vacuum at a vacuum level of at least 22 inches of mercury.

Clause 70: The pECM system of any of clauses 64-69, wherein the working surface of the electrode defines at least one protrusion configured to define a recess in the target surface of the workpiece after machining of the workpiece, wherein the at least one protrusion defines depth dimension and a length dimension, and the length dimension has greater magnitude than the depth dimension.

Clause 71: The pECM system of any of clauses 64-70, wherein the pECM assembly comprises a manifold block defining at least one electrolyte inlet and at least one electrolyte outlet fluidically coupling the electrolyte system to the working surface of the electrode.

Clause 72: The pECM system of any of clauses 64-71, wherein the pECM assembly comprises a baffle element defining at least one electrolyte inlet and at least one electrolyte outlet fluidically coupling the electrolyte system to the working surface of the electrode, wherein the baffle element is configured to distribute electrolyte into a plurality of apertures in the working surface of the electrode.

Clause 73: The pECM system of clause 64, wherein the vacuum system comprises an eductor configured to pull electrolyte out of the interelectrode gap.

Clause 74: A method for pulsed electrochemical machining (pECM) a workpiece includes generating a pulsed direct current between an electrode of a machining assembly and the workpiece, wherein the machining assembly comprises a tool body defining a tool axis, the tool body comprises an electrode, and the electrode comprises an electrically conductive material and defines a working surface configured to face the workpiece, delivering an electrolyte into an interelectrode gap between the working surface of the electrode and a target surface of the workpiece through an electrolyte system, pulling the electrolyte out of the interelectrode gap using a vacuum system of the electrolyte system; and positioning the working surface of the electrode relative to the target surface of the workpiece to remove material from the target surface of the workpiece.

Clause 75: The method of clause 73, further comprising circulating electrolyte through the electrolyte system, wherein the electrolyte system comprises an electrolyte storage tank, and wherein the vacuum system comprises a vacuum pump disposed between an outlet of the pECM machining assembly and the electrolyte supply container.

Clause 76: The method of clause 74 or 75, further comprising pushing electrolyte through the electrode into the interelectrode gap using a pump disposed between the electrolyte storage tank and an inlet of the pECM machining assembly.

Clause 77: The method of clause 74-76, wherein pulling electrode out of the interelectrode gap comprises flowing electrolyte through a channel fluidically coupled to the vacuum system defined by the one or more electrodes.

Clause 78: The method of clause 77, wherein the channel fluidically coupled to the vacuum system contacts the tool axis.

Clause 79: The method of any of clauses 74-78, wherein vacuum system comprises a vacuum pump, and wherein the vacuum pump is configured to pull vacuum at a vacuum level of at least 22 inches of mercury.

Clause 80: The method of any of clauses 74-79, further comprising machining a recess into the workpiece using the working surface of the electrode, wherein the working surface of the electrode defines at least one protrusion configured to define a recess in the target surface of the workpiece after machining of the workpiece, wherein the at least one protrusion defines depth dimension and a length dimension, and the length dimension has greater magnitude than the depth dimension.

Clause 81: The method of any of clauses 74-80, wherein delivering electrolyte into the interelectrode gap comprises flowing electrolyte through a manifold block, wherein the manifold block defines at least one electrolyte inlet and at least one electrolyte outlet fluidically coupling the electrolyte system to the working surface of the electrode.

Clause 82: The method of any of clauses 74-81, wherein delivering electrolyte into the interelectrode gap comprises flowing electrolyte through a baffle element defining at least one electrolyte inlet and at least one electrolyte outlet fluidically coupling the electrolyte system to the working surface of the electrode, wherein the baffle element is configured to distribute electrolyte into a plurality of apertures in the working surface of the electrode.

Clause 83: The method of clause 74, wherein pulling the electrolyte out of the interelectrode gap comprises pulling electrolyte out of the interelectrode gap with an eductor.

The invention claimed is:

1. A pulsed electrochemical machining (pECM) assembly, comprising:
   a tool body defining a tool axis, the tool body comprising an electrode, the electrode comprising an electrically conductive material and defining a working surface configured to face a workpiece, wherein:
   the working surface defines a plurality of apertures configured to fluidically couple to an electrolyte system,
   the working surface comprises a central portion of the working surface and a perimeter portion of the working surface, wherein a surface area of the central portion is approximately equal to a surface area of the perimeter portion,
   the central portion is configured to deliver a greater volume of electrolyte to the interelectrode gap than the perimeter portion, and
   the central portion defines more aperture area per unit total area than the perimeter portion.

2. The pECM machining assembly of claim 1, wherein the electrode defines a first end defining the working surface and a second end, and each aperture of the plurality of apertures corresponds to a channel of a plurality of channels extending through the electrode from the working surface at least part of the way to the second end.

3. The pECM machining assembly of claim 2, wherein at least one channel of the plurality of channels extends through the electrode from the working surface to the second end.

4. The pECM machining assembly of claim 2, wherein at least one channel of the plurality of channels is fluidically coupled to an electrolyte inlet.

5. The pECM machining assembly of claim 2, wherein at least one channel of the plurality of channels is fluidically coupled to an electrolyte outlet.

6. The pECM machining assembly of claim 1, wherein the electrode comprises a metal.

7. The pECM machining assembly of claim 1, wherein the electrode is formed through additive manufacturing.

8. The pECM machining assembly of claim 1, wherein the electrode is additively manufactured in a single, complete piece.

9. The pECM machining assembly of any of claim 1, wherein the plurality of apertures are evenly distributed across the working surface.

10. The pECM machining assembly of claim 1, wherein the electrode defines a first end and a second end, and each aperture of the plurality of apertures corresponds to a channel of a plurality of channels extending from the first end of the electrode to the second end of the electrode,
    wherein each channel of the plurality of channels defines a minimum cross-sectional area, and
    wherein at least one first channel of the plurality of channels opens at the first end in the central portion of the working surface and at least one second channel of the plurality of channels open at the first end in the perimeter portion of the working surface, and
    wherein each first channel of the at least one first channel opening into the central portion of the working surface defines a larger minimum cross-sectional area than each second channel of the at least one second channel opening into the perimeter portion of the working surface.

11. The pECM machining assembly of claim 1, wherein the tool body is configured to form a seal around at least a portion of a perimeter of an interelectrode gap when coupled a flow block.

12. The pECM machining assembly of claim 1, wherein the electrode defines a channel configured to be fluidically coupled to a vacuum system.

13. The pECM machining assembly of claim 11, further comprising the flow block mechanically coupled to the electrode.

14. A pECM system comprising the pECM machining assembly of claim 1.

15. The pECM system of claim 14, the pECM system further comprising a vacuum system configured to pull electrolyte out of the interelectrode gap.

16. A method for pulsed electrochemical machining (pECM) a workpiece, comprising:
    generating a pulsed direct current between an electrode of a tool body of a pECM machining assembly and the workpiece, the tool body defining a tool axis, and the electrode comprising an electrically conductive material and defining a working surface at a first end configured to face the workpiece,
    delivering an electrolyte through a plurality of apertures in the working surface into an interelectrode gap between the working surface of electrode and a target surface of the workpiece, wherein the plurality of apertures fluidically couple to an electrolyte system, wherein:
    the working surface comprises a central portion of the working surface and a perimeter portion of the working surface, wherein a surface area of the central portion is approximately equal to a surface area of the perimeter portion,
    the central portion is configured to deliver a greater volume of electrolyte to the interelectrode gap than the perimeter portion, and
    the central portion defines more aperture area per unit total area than the perimeter portion; and
    positioning the working surface of the electrode relative to the target surface of the workpiece to remove material from the target surface of the workpiece.

17. The method of claim 16, wherein the electrode defines the first end defining the working surface and a second end, each aperture of the plurality of apertures corresponds to a channel of a plurality of channels extending from the working surface at least partway through the electrode towards the second end of the electrode, and delivering electrolyte into the interelectrode gap includes flowing electrolyte through at least one channel of the plurality of channels.

18. The method of claim 17, wherein delivering electrolyte into the interelectrode gap comprises feeding electrolyte through at least one channel of the plurality of channels, wherein the at least one channel extends through the electrode from the working surface to the second end.

19. The method of claim 18, wherein at least one channel of the plurality of channels is fluidically coupled to an electrolyte inlet.

* * * * *